US012621461B2

(12) United States Patent
Huang et al.

(10) Patent No.: US 12,621,461 B2
(45) Date of Patent: May 5, 2026

(54) CODING AFFINE MOTION MODELS FOR VIDEO CODING

(71) Applicant: QUALCOMM Incorporated, San Diego, CA (US)

(72) Inventors: Han Huang, San Diego, CA (US); Vadim Seregin, San Diego, CA (US); Zhi Zhang, Munich (DE); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/610,832

(22) Filed: Mar. 20, 2024

(65) Prior Publication Data

US 2024/0348796 A1        Oct. 17, 2024

Related U.S. Application Data

(60) Provisional application No. 63/495,957, filed on Apr. 13, 2023.

(51) Int. Cl.

| | |
|---|---|
| *H04N 11/02* | (2006.01) |
| *H04N 19/139* | (2014.01) |
| *H04N 19/159* | (2014.01) |
| *H04N 19/176* | (2014.01) |
| *H04N 19/513* | (2014.01) |
| *H04N 19/70* | (2014.01) |

(52) U.S. Cl.
CPC ......... *H04N 19/139* (2014.11); *H04N 19/159* (2014.11); *H04N 19/176* (2014.11); *H04N 19/513* (2014.11); *H04N 19/70* (2014.11)

(58) Field of Classification Search
CPC ...................................................... H04N 19/139
USPC ...................................................... 375/240.16
See application file for complete search history.

(56) References Cited

U.S. PATENT DOCUMENTS

| | | | |
|---|---|---|---|
| 12,003,757 B2 * | 6/2024 | Salehifar .............. | H04N 19/176 |
| 2012/0328022 A1 * | 12/2012 | Sasai .................. | H04N 19/1887 |
| | | | 375/240.16 |
| 2014/0092970 A1 * | 4/2014 | Misra ..................... | H04N 19/52 |
| | | | 375/240.16 |

(Continued)

OTHER PUBLICATIONS

Coban M., et al., "Algorithm Description of Enhanced Compression Model 8 (ECM 8)", JVET-AC2025, Joint Video Experts Team (JVET) of ITU-T SG 16 WP 3 and ISO/IEC JTC 1/SC 29, 29th Meeting, by teleconference, Jan. 11-20, 2023, pp. 1-74.

(Continued)

*Primary Examiner* — Leron Beck
(74) *Attorney, Agent, or Firm* — Shumaker & Sieffert, P.A.

(57) ABSTRACT

A video decoder may receive a block of video data to be decoded using a 6-parameter affine advanced motion vector predictor (AMVP) mode. The video decoder may decode a first syntax element indicating a first motion vector difference (MVD) for a first control point motion vector (CPMV) for the block, and also decode a flag that indicates if a second MVD for a second CPMV for the block and a third MVD for a third CPMV for the block are equal to the first MVD. The video decoder may further determine the second MVD and the third MVD based on the flag, and decode the block of video data using the first MVD, the second MVD, and the third MVD to generate a decoded block.

30 Claims, 10 Drawing Sheets

(56) References Cited

U.S. PATENT DOCUMENTS

| | | | | |
|---|---|---|---|---|
| 2017/0332095 A1* | 11/2017 | Zou | ......................... | H04N 19/44 |
| 2019/0028731 A1* | 1/2019 | Chuang | ................ | H04N 19/176 |
| 2019/0110064 A1* | 4/2019 | Zhang | .................. | H04N 19/184 |
| 2019/0208211 A1* | 7/2019 | Zhang | .................. | H04N 19/517 |
| 2019/0273943 A1* | 9/2019 | Zhao | ..................... | H04N 19/139 |
| 2020/0112725 A1* | 4/2020 | Huang | ................. | H04N 19/139 |
| 2020/0137398 A1* | 4/2020 | Zhao | .................... | H04N 19/137 |
| 2020/0213612 A1* | 7/2020 | Liu | ......................... | H04N 19/53 |
| 2020/0221108 A1* | 7/2020 | Xu | ......................... | H04N 19/176 |
| 2020/0296425 A1* | 9/2020 | Seregin | ................ | H04N 19/174 |
| 2020/0374550 A1* | 11/2020 | Huang | ............... | H04N 19/1883 |
| 2021/0195230 A1 | 6/2021 | Huang et al. | | |
| 2023/0007287 A1 | 1/2023 | Li et al. | | |
| 2023/0396797 A1* | 12/2023 | Li | ......................... | H04N 19/176 |

OTHER PUBLICATIONS

Huang H., et al., "Non-EE2: Affine AMVP Mode with One MVD", JVET-AD0180-v3, Joint Video Experts Team (JVET) of ITU-T SG 16 WP 3 and ISO/IEC JTC 1/SC 29 30th Meeting, Antalya, TR, Apr. 21-28, 2023, pp. 1-3.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Seregin V., et al., "Exploration Experiment on Enhanced Compression beyond VVC capability (EE2)", JVET-Y2024-v2, Joint Video Experts Team (JVET) of ITU-T SG 16 WP 3 and ISO/IEC JTC 1/SC 29, 25th Meeting, by teleconference, Jan. 12-21, 2022, pp. 1-15.

Huang H (Qualcomm)., et al., "Non-EE2: Affine AMVP Mode with One MVD", 30. JVET Meeting, Antalya, (THe Joint Video Exploration Team of ISO/IEC JTC1/SC29/WG11 and ITU-T SG.16), No. JVET-AD0180-v1, m62847, Apr, 21, 2023-Apr. 28, 2023, Apr. 14, 2023, 2 Pages, XP030308915, the whole document.

International Search Report and Written Opinion—PCT/US2024/020955—ISA/EPO—Jun. 7, 2024 15 Pages.

Xiu X (Kwai)., "Cross-check of JVET-AD0180 (Non-EE2: Affine AMVP Mode with One MVD)", 30. JVET Meeting, Antalya, (The Joint Video Exploration Team of ISO/IEC JTC1/SC29/WG11 and ITU-T SG.16), No. JVET-AD0395-v1, m63518, Apr. 21, 2023-Apr. 28, 2023, Apr. 27, 2023, 1 Page, XP030309281, the whole document.

* cited by examiner

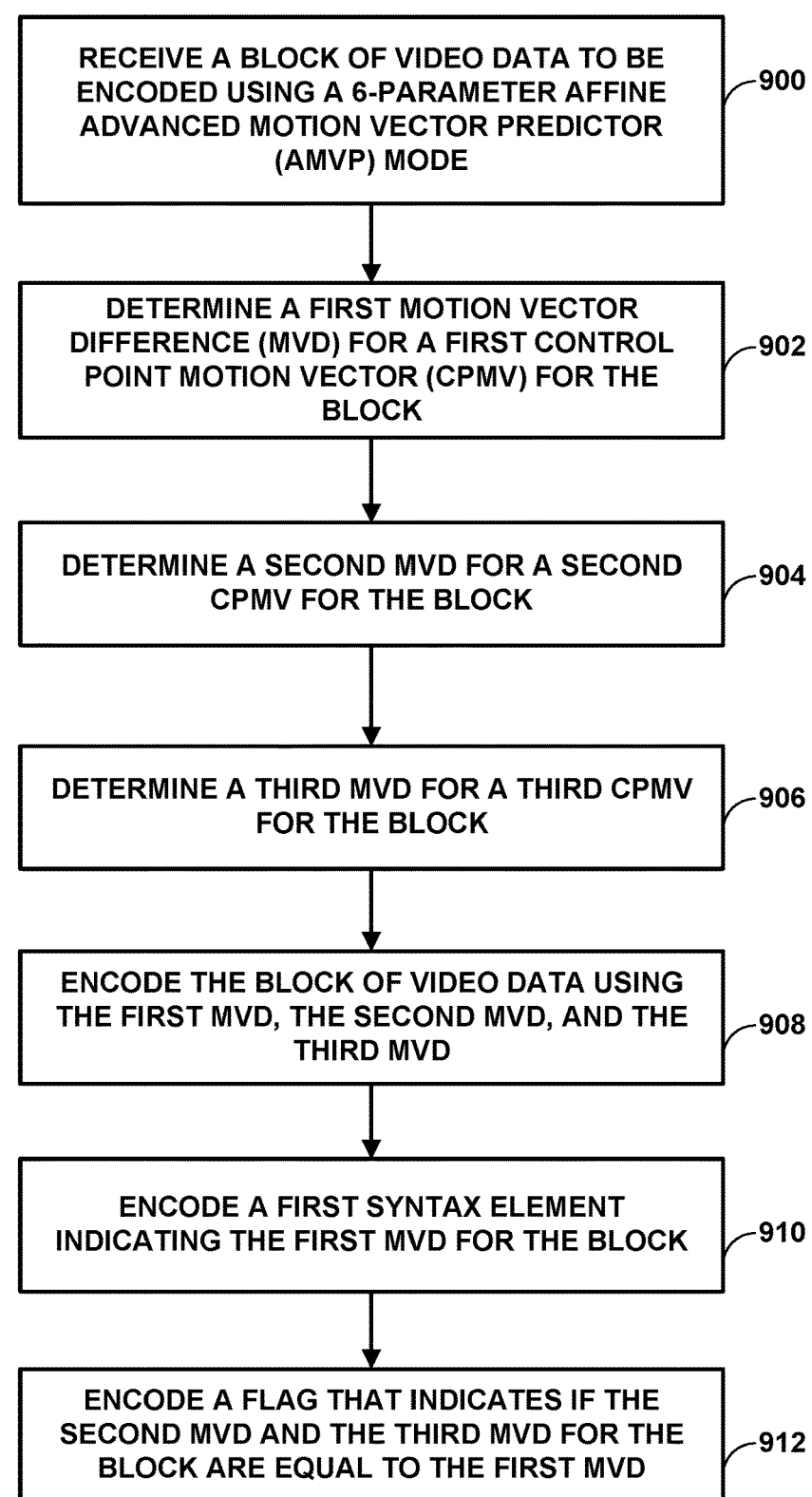

RECEIVE A BLOCK OF VIDEO DATA TO BE ENCODED USING A 6-PARAMETER AFFINE ADVANCED MOTION VECTOR PREDICTOR (AMVP) MODE — 900

DETERMINE A FIRST MOTION VECTOR DIFFERENCE (MVD) FOR A FIRST CONTROL POINT MOTION VECTOR (CPMV) FOR THE BLOCK — 902

DETERMINE A SECOND MVD FOR A SECOND CPMV FOR THE BLOCK — 904

DETERMINE A THIRD MVD FOR A THIRD CPMV FOR THE BLOCK — 906

ENCODE THE BLOCK OF VIDEO DATA USING THE FIRST MVD, THE SECOND MVD, AND THE THIRD MVD — 908

ENCODE A FIRST SYNTAX ELEMENT INDICATING THE FIRST MVD FOR THE BLOCK — 910

ENCODE A FLAG THAT INDICATES IF THE SECOND MVD AND THE THIRD MVD FOR THE BLOCK ARE EQUAL TO THE FIRST MVD — 912

FIG. 9

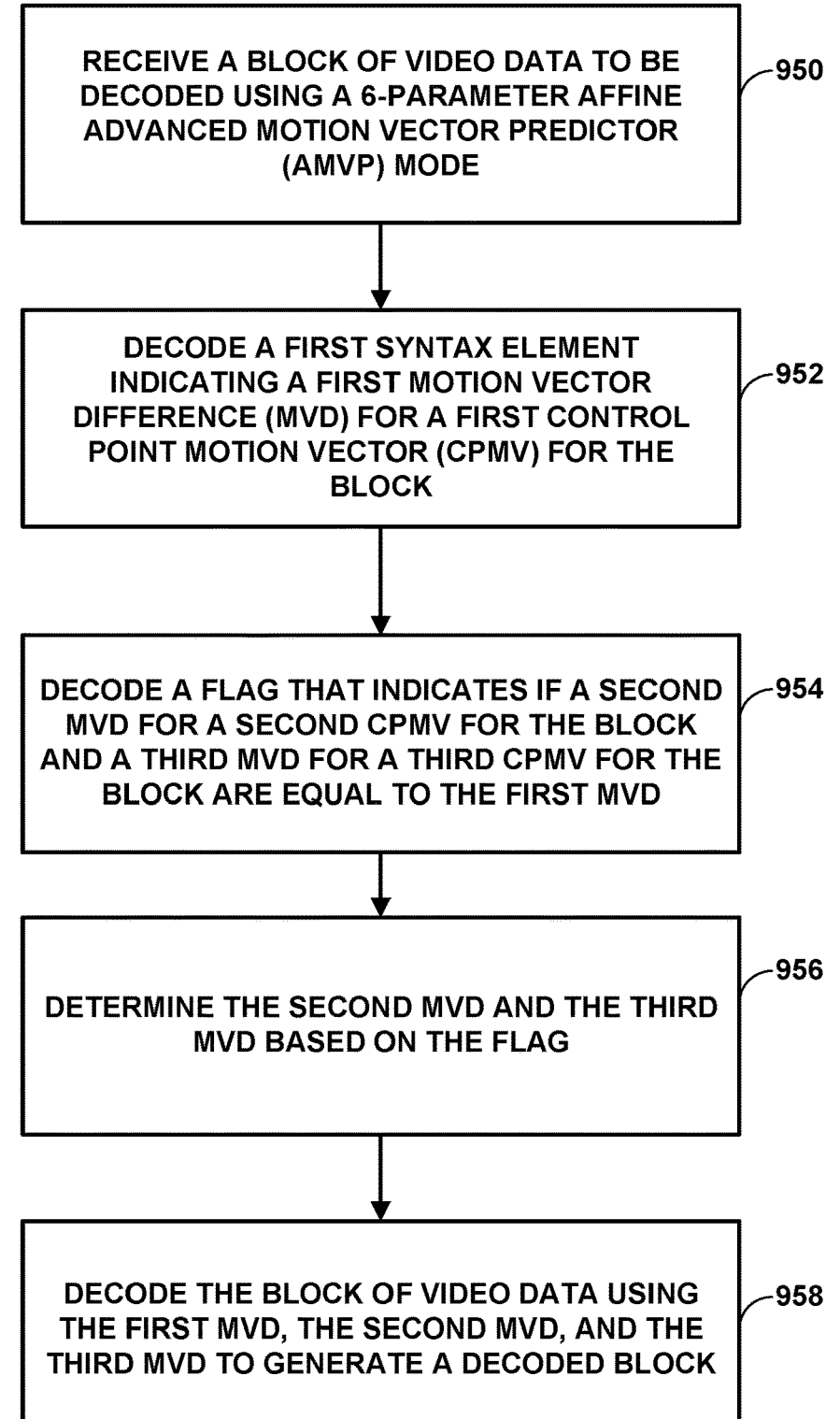

RECEIVE A BLOCK OF VIDEO DATA TO BE DECODED USING A 6-PARAMETER AFFINE ADVANCED MOTION VECTOR PREDICTOR (AMVP) MODE ⁓950

DECODE A FIRST SYNTAX ELEMENT INDICATING A FIRST MOTION VECTOR DIFFERENCE (MVD) FOR A FIRST CONTROL POINT MOTION VECTOR (CPMV) FOR THE BLOCK ⁓952

DECODE A FLAG THAT INDICATES IF A SECOND MVD FOR A SECOND CPMV FOR THE BLOCK AND A THIRD MVD FOR A THIRD CPMV FOR THE BLOCK ARE EQUAL TO THE FIRST MVD ⁓954

DETERMINE THE SECOND MVD AND THE THIRD MVD BASED ON THE FLAG ⁓956

DECODE THE BLOCK OF VIDEO DATA USING THE FIRST MVD, THE SECOND MVD, AND THE THIRD MVD TO GENERATE A DECODED BLOCK ⁓958

FIG. 10

CODING AFFINE MOTION MODELS FOR VIDEO CODING

This application claims the benefit of U.S. Provisional Patent Application No. 63/495,957, filed Apr. 13, 2023, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter prediction in video codecs. More specifically, this disclosure describes devices and techniques for coding affine motion and/or affine motion models. In one example, this disclosure describes coding a flag that indicates if a second motion vector difference (MVD) and a third MVD are equal to a first MVD. In another example, this disclosure describes signaling techniques related to an advanced motion vector prediction (AMVP)-merge mode. In another example, this disclosure describes techniques related to affine flag checking when generating an affine candidate list using a constructed affine motion vector predictor. The techniques of this disclosure may improve coding efficiency and/or improve image quality.

In one example, this disclosure describes a method of decoding video data, the method comprising receiving a block of video data to be decoded using a 6-parameter affine AMVP mode, decoding a first syntax element indicating a first MVD for a first control point motion vector (CPMV) for the block, decoding a flag that indicates if a second MVD for a second CPMV for the block and a third MVD for a third CPMV for the block are equal to the first MVD, determining the second MVD and the third MVD based on the flag, and decoding the block of video data using the first MVD, the second MVD, and the third MVD to generate a decoded block.

In another example, this disclosure describes an apparatus configured to decode video data, the apparatus comprising a memory, and one or more processors implemented in circuitry and in communication with the memory, the one or more processors configured to receive a block of video data to be decoded using a 6-parameter affine AMVP mode, decode a first syntax element indicating a first MVD for a first CPMV for the block, decode a flag that indicates if a second MVD for a second CPMV for the block and a third MVD for a third CPMV for the block are equal to the first MVD, determine the second MVD and the third MVD based on the flag, and decode the block of video data using the first MVD, the second MVD, and the third MVD to generate a decoded block.

In another example, this disclosure describes a method of encoding video data, the method comprising receiving a block of video data to be encoded using a 6-parameter affine AMVP mode, determining a first MVD for a first CPMV for the block, determining a second MVD for a second CPMV for the block, determining a third MVD for a third CPMV for the block, encoding the block of video data using the first MVD, the second MVD, and the third MVD, encoding a first syntax element indicating the first MVD for the block, and encoding a flag that indicates if the second MVD and the third MVD for the block are equal to the first MVD.

In another example, this disclosure describes an apparatus configured to encode video data, the apparatus comprising a memory, and one or more processors implemented in circuitry and in communication with the memory, the one or more processors configured to receive a block of video data to be encoded using a 6-parameter affine AMVP mode, determine a first MVD for a first CPMV for the block, determine a second MVD for a second CPMV for the block, determine a third MVD for a third CPMV for the block, encode the block of video data using the first MVD, the second MVD, and the third MVD, encode a first syntax element indicating the first MVD for the block, and encode a flag that indicates if the second MVD and the third MVD for the block are equal to the first MVD.

The details of one or more examples are set forth in the accompanying drawings and the description below. Other features, objects, and advantages will be apparent from the description, drawings, and claims.

BRIEF DESCRIPTION OF DRAWINGS

FIG. 9 is a flowchart illustrating another example method for encoding a current block in accordance with the techniques of this disclosure.

FIG. 10 is a flowchart illustrating another example method for decoding a current block in accordance with the techniques of this disclosure.

DETAILED DESCRIPTION

In general, this disclosure describes techniques for inter prediction in video codecs. More specifically, this disclosure describes devices and techniques for coding affine motion and/or affine motion models. A video coder may be configured to code video data using one of a plurality of affine motion models and/or affine coding modes. In general, an affine coding mode may be able to more efficiently code video data that exhibits more complex motion compared to traditional translational inter prediction. Example affine coding modes described below may include affine merge mode, affine AMVP mode, affine AMVP-merge mode, among others.

In one example for affine AMVP mode, this disclosure describes coding a flag that indicates if a second MVD and a third MVD are equal to a first MVD. In another example for affine AMVP-merge mode, this disclosure describes signaling techniques related to an advanced motion vector prediction (AMVP)-merge mode. In another example, this disclosure describes techniques related to affine flag checking when generating an affine candidate list using a constructed affine motion vector predictor. The techniques of this disclosure may improve coding efficiency and/or improve image quality.

Figure 1:
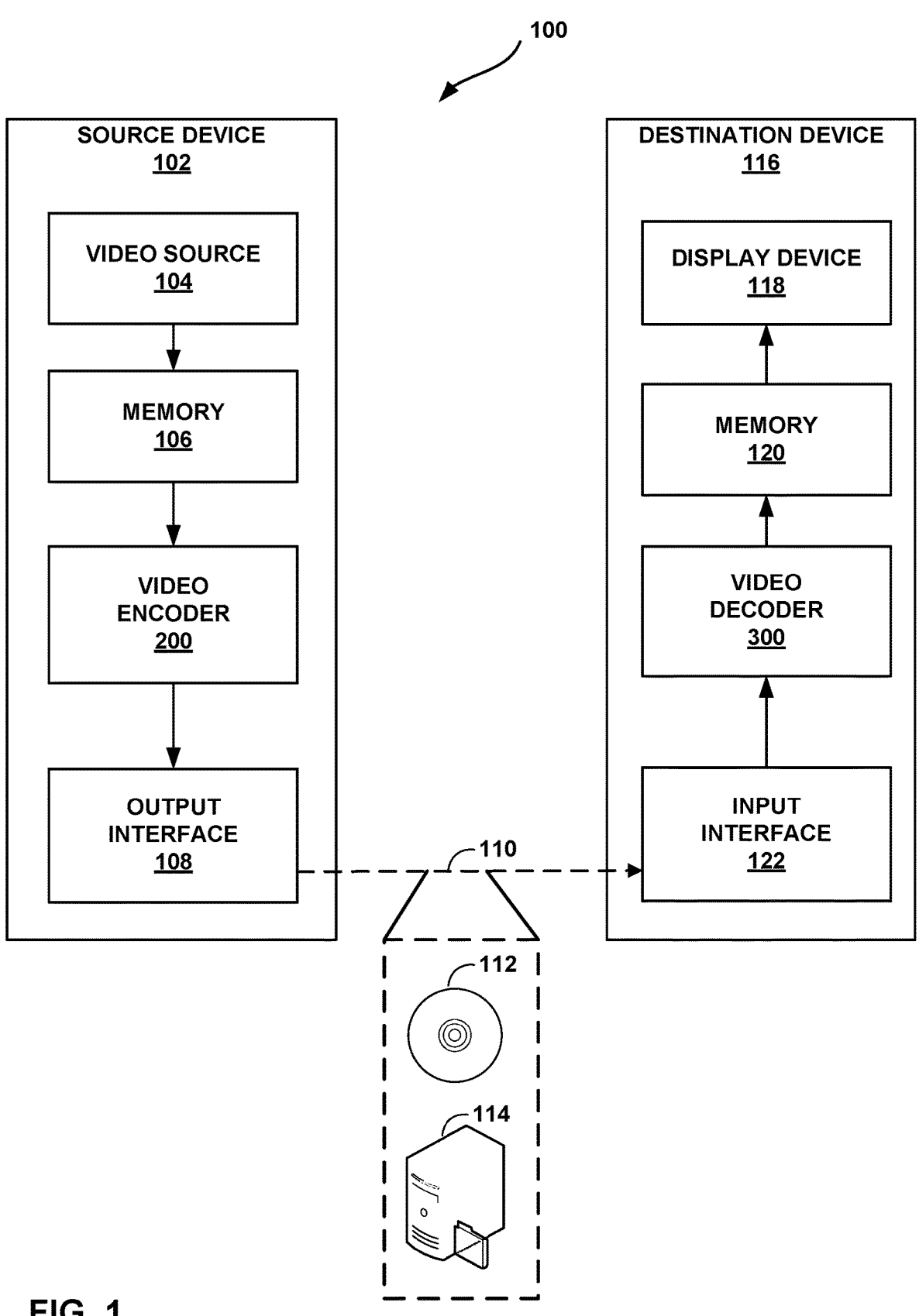
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding affine motion. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding affine motion. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use affine motion to code video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUS.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As will be described in more detail below, this disclosure describes techniques for coding affine motion and/or affine motion models. Video encoder 200 and video decoder 300 may be configured to code video data using one of a plurality of affine motion models and/or affine coding modes. In general, an affine coding mode may be able to more efficiently code video data that exhibits more complex motion compared to traditional translational inter prediction. Example affine coding modes described below may include affine merge mode, affine AMVP mode, affine AMVP-merge mode, among others.

In one example for affine AMVP mode, this disclosure describes coding a flag that indicates if a second MVD and a third MVD are equal to a first MVD. In another example for affine AMVP-merge mode, this disclosure describes signaling techniques related to an advanced motion vector prediction (AMVP)-merge mode. In another example, this disclosure describes techniques related to affine flag checking when generating an affine candidate list using a constructed affine motion vector predictor. The techniques of this disclosure may improve coding efficiency and/or improve image quality.

Affine Motion Models

An affine motion model can be described as follows:

$$\begin{cases} v_x = ax + by + e \\ v_y = cx + dy + f \end{cases},$$

wherein $(v_x, v_y)$ is the motion vector at the coordinate $(x, y)$, and a, b, c, d, e, and f are affine parameters. The above affine motion model may be referred to as a 6-parameters affine motion model. In an example video coder, a picture is partitioned into blocks for block-based coding. The affine motion model for a block can also be described by the three motion vectors (MVs) $\vec{v}_0=(v_{ox}, v_{oy})$, $\vec{v}_1=(v_{1x}, v_{1y})$, and $\vec{v}_2=(v_{2x}, v_{2y})$ at three different locations that are not in the same line. The three locations are usually referred to as control-points and the three motion vectors are referred to as control-point motion vectors (CPMVs). In the case when the three control-points are at three corners of the block, the affine motion can be described as follows:

$$\begin{cases} v_x = \dfrac{(v_{1x} - v_{0x})}{blkW}x + \dfrac{(v_{2x} - v_{0x})}{blkH}y + v_{0x} \\ v_y = \dfrac{(v_{1y} - v_{0y})}{blkW}x + \dfrac{(v_{2y} - v_{0y})}{blkH}y + v_{0y} \end{cases},$$

wherein blkW and blkH are the width and height of the block, respectively.

In affine mode, different motion vectors can be derived for each pixel or sample in the block according to the associated affine motion model. Therefore, motion compensation can be performed pixel-by-pixel or sample-by-sample. However, to reduce complexity, subblock based motion compensation may be performed, wherein the block is partitioned into multiple subblocks (that have a smaller block size) and each subblock is associated with one motion vector for block-based motion compensation. The motion vector for each subblock is derived using the representative coordinate of the subblock. For example, the center position may be used as the representative coordinate. In one example, the block is partitioned into non-overlapping subblocks. The block width is blkW, block height is blkH, the subblock width is sbW and the subblock height is sbH. As such, there are blkH/sbH rows of subblocks and blkW/sbW subblocks in each row. For a six-parameter affine motion model, the motion vector for the subblock (referred to as subblock MV) at the $i_{th}$ row ($0 \le i < blkW/sbW$) and the $j_{th}$ ($0 \le j < blkH/sbH$) column is derived as follows:

$$\begin{cases} v_x = \dfrac{(v_{1x} - v_{0x})}{blkW}\left(j*sbW + \dfrac{sbW}{2}\right) + \dfrac{(v_{2x} - v_{0x})}{blkH}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{2y} - v_{0y})}{blkH}\left(i*sbH + \dfrac{sbH}{2}\right) + v_{0y} \end{cases}$$

In some examples, the subblock MVs are rounded to a predefined precision and stored in a motion buffer for motion compensation and motion vector prediction.

A simplified 4-parameters affine model (for zoom and rotational motion) is described as follows:

$$\begin{cases} v_x = ax - by + e \\ v_y = bx + ay + f \end{cases}$$

Similarly, the 4-parameters affine model for a block can be described by two CPMVs $\vec{v}_0=(v_{ox}, v_{oy})$ and $\vec{v}_1=(v_{1x}, v_{1y})$ at two corners (typically top-left and top-right) of the block. The motion field is then described as follows:

$$\begin{cases} v_x = \dfrac{(v_{1x} - v_{0x})}{blkW}x - \dfrac{(v_{1y} - v_{0y})}{blkW}y + v_{0x} \\ v_y = \dfrac{(v_{1y} - v_{0y})}{blkW}x + \dfrac{(v_{1x} - v_{0x})}{blkW}y + v_{0y} \end{cases}$$

The subblock MV at $i_{th}$ row and $j_{th}$ column is derived as follows:

$$\begin{cases} v_x = \dfrac{(v_{1x} - v_{0x})}{blkW}\left(j*sbW + \dfrac{sbW}{2}\right) - \dfrac{(v_{1y} - v_{0y})}{blkW}\left(i*sbH + \dfrac{sbH}{2}\right) + v_{0x} \\ v_y = \dfrac{(v_{1y} - v_{0y})}{blkW}\left(j*sbW + \dfrac{sbW}{2}\right) + \dfrac{(v_{1x} - v_{0x})}{blkW}\left(i*sbH + \dfrac{sbH}{2}\right) + v_{0y} \end{cases}$$

Prediction Refinement for Affine Mode

In some examples, after the sub-block based affine motion compensation is performed, video encoder 200 and/or video decoder 300 may be configured to refine the prediction signal by adding an offset derived based on pixel-wise (or sample-wise) motion and the gradient of the prediction signal. Video encoder 200 and/or video decoder 300 may calculate the offset at location (m, n) as:

$$\Delta I(m, n) = g_x(m, n) * \Delta v_x(m, n) + g_y(m, n) * \Delta v_y(m, n),$$

wherein $g_x(m, n)$ is the horizontal gradient and $g_y(m, n)$ is the vertical gradient of the prediction signal, respectively. $\Delta v_x(m, n)$ and $\Delta v_y(m, n)$ are the differences in x and y components between the motion vector calculated at pixel location (m, n) and the subblock MV. The coordinate of the top-left sample of the subblock may be defined as (0,0), and the center of the subblock is $$\left(\dfrac{sbW}{2}, \dfrac{sbH}{2}\right).$$

Given the affine motion parameters a, b, c, and d, video encoder 200 and/or video decoder 300 may derive the values of $\Delta v_x(m, n)$ and $\Delta v_y(m, n)$ as follows:

$$\Delta v_x(m, n) = a*\left(m - \dfrac{sbW}{2}\right) + b*\left(n - \dfrac{sbH}{2}\right)$$

$$\Delta v_y(m, n) = c*\left(m - \dfrac{sbW}{2}\right) + d*\left(n - \dfrac{sbH}{2}\right)$$

In the control-points based affine motion model, video encoder 200 and/or video decoder 300 may determine the affine motion parameters a, b, c, and d from the CPMVs as follows:

$$a = \dfrac{(v_{1x} - v_{0x})}{blkW}$$

$$b = \dfrac{(v_{2x} - v_{0x})}{blkH}$$

$$c = \dfrac{(v_{1y} - v_{0y})}{blkW}$$

$$d = \dfrac{(v_{2y} - v_{0y})}{blkH}$$

Affine Merge Mode

Figure 2:
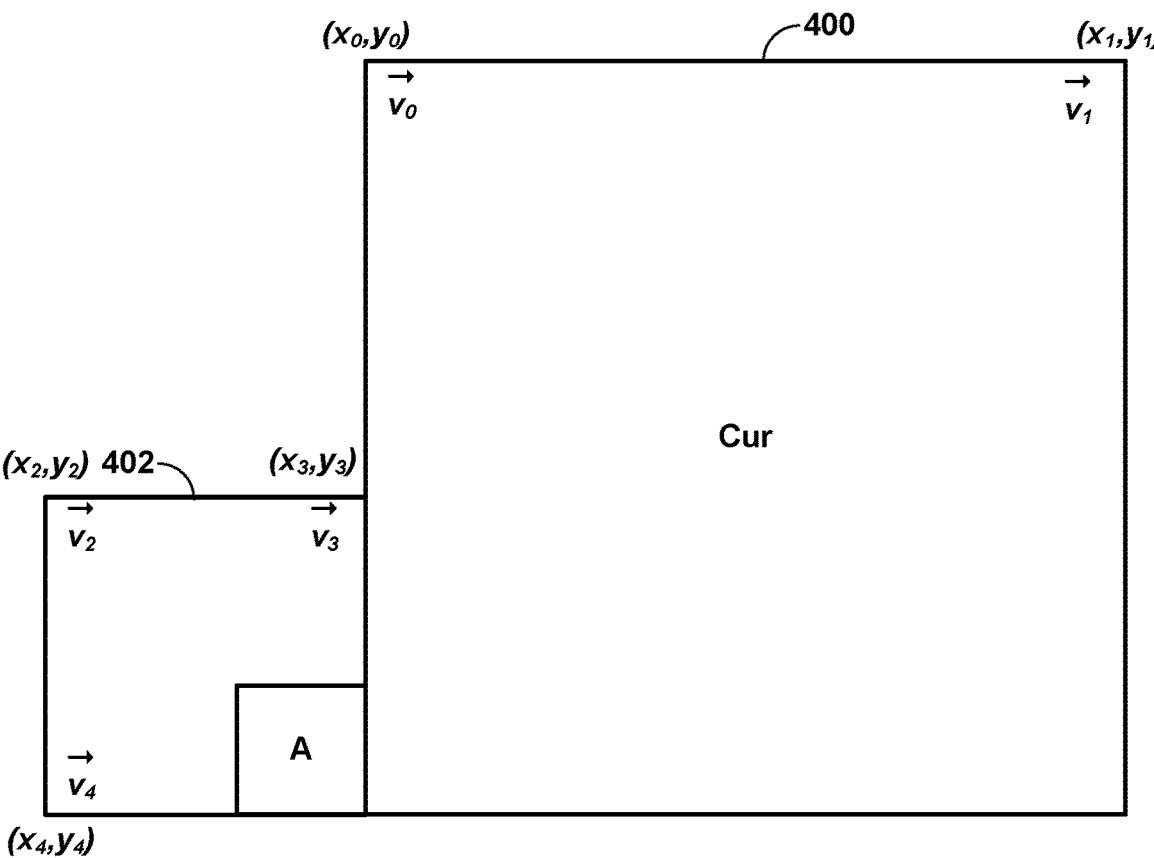
FIG. 2 is a conceptual diagram illustrating an example of control point motion vector inheritance.

In affine merge mode of VVC, video encoder 200 and/or video decoder 300 may generate the CPMVs of the current CU based on the motion information of the spatial neighboring CUs. In an example of VVC, there can be up to five candidates and video encoder 200 may signal an index to indicate the candidate to be used for the current CU. In VVC, the following three types of candidate are used to form the affine merge candidate list:

Inherited affine merge candidates that are extrapolated from the CPMVs of the neighbour CUs Constructed affine merge candidates that are derived using the translational MVs of the neighbour CUs Zero MVs In VVC, when a neighboring affine CU is identified, video encoder 200 and/or video decoder 300 may use the control point motion vectors of the neighboring affine CU to derive the inherited affine merge candidate in the affine merge list of the current CU. As shown in FIG. 2, if the neighbour left bottom block A of current (cur) CU 400 is coded in affine mode, the motion vectors $v_2$, $v_3$ and $v_4$ of the top left corner, above right corner and left bottom corner of CU 402 which contains the block A are obtained. When block A is coded with a 4-parameter affine model, video encoder 200 and/or video decoder 300 calculate the two CPMVs of current CU 400 according to motion vectors $v_2$, and $v_3$. In case that block A is coded with a 6-parameter affine model, video encoder 200 and/or video decoder 300 calculate the three CPMVs of current CU 400 according to $v_2$, $v_3$ and $v_4$.

Figure 3:
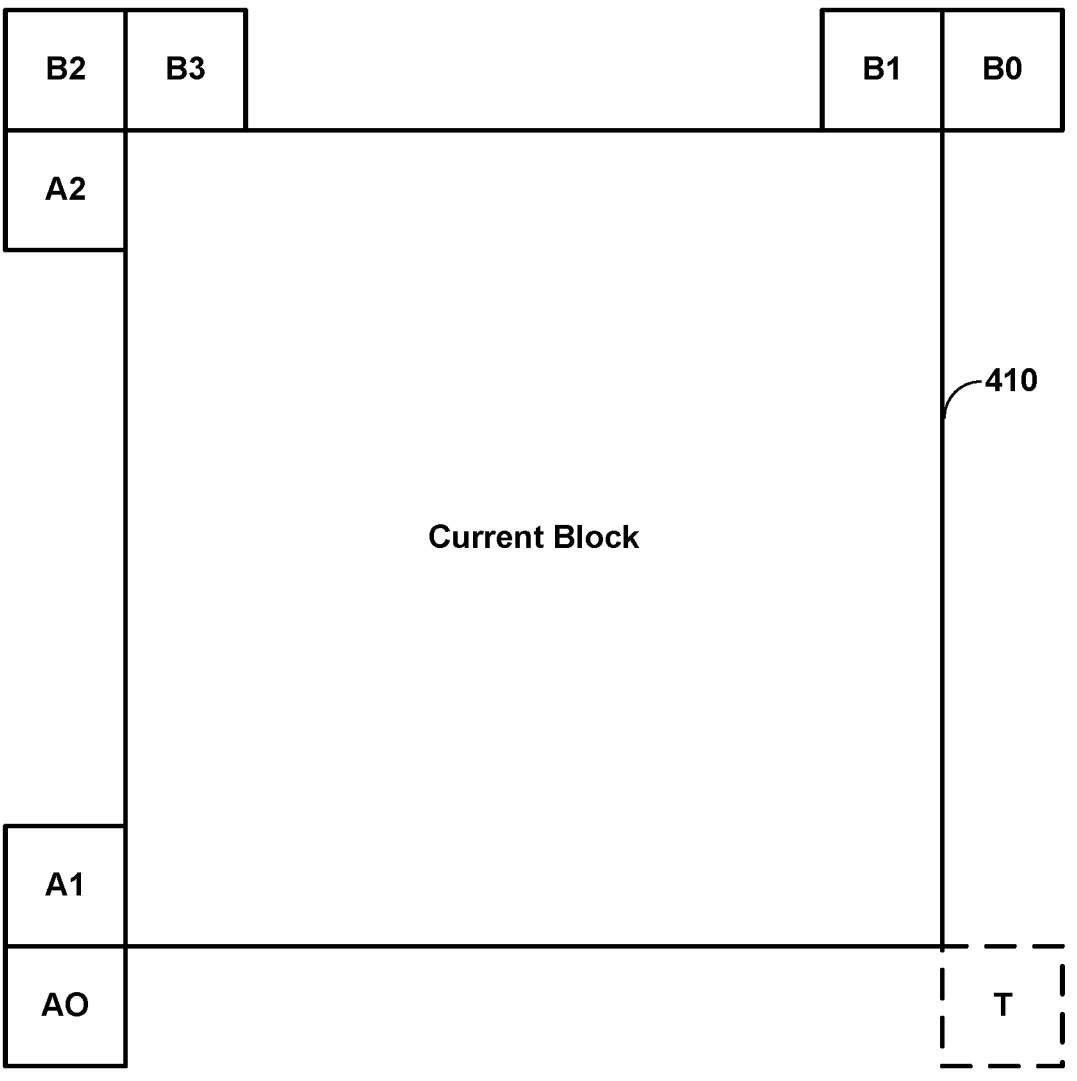
FIG. 3 is a conceptual diagram illustrating an example of location of candidate positions for constructed affine merge mode.

A constructed affine candidate means the candidate is constructed by combining the neighbor translational motion information of each control point. The motion information for the control points is derived from the specified spatial neighbors (A0, A1, A2, B0, B1, B2, and B3) and temporal neighbor (T) of current block 410 shown in FIG. 3. $CPMV_k$ (k=1, 2, 3, 4) represents the k-th control point. For $CPMV_1$, video encoder 200 and/or video decoder 300 check the B2->B3->A2 blocks in that order and the MV of the first available block is used. For $CPMV_2$, video encoder 200 and/or video decoder 300 check the B1->B0 blocks in that order. For $CPMV_3$, video encoder 200 and/or video decoder 300 check the A1->A0 blocks in that order. A temporal motion vector predictor (TMVP) is used as $CPMV_4$ if it is available.

After MVs of four control points are obtained, video encoder 200 and/or video decoder 300 construct affine merge candidates based on that motion information. The following combinations of control point MVs are used, in order, to construct an affine candidate:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of three CPMVs constructs a 6-parameter affine merge candidate and the combination of two CPMVs constructs a 4-parameter affine merge candidate. To avoid a motion scaling process, if the reference indices of control points are different, video encoder 200 and/or video decoder 300 may discard the related combination of control point MVs.

After inherited affine merge candidates and constructed affine merge candidate are checked, if the list is still not full, video encoder 200 and/or video decoder 300 may insert zero MVs to the end of the list (e.g., until the list reaches a predetermined number of candidates).

Affine AMVP Mode

In VVC, video encoder 200 is configured to signal an affine flag in the bitstream at the CU level to indicate whether affine AMVP mode is used. Then, video encoder 200 is configured to signal another flag to indicate whether a 4-parameter affine model or a 6-parameter affine model is used. In affine AMVP mode, video encoder 200 is configured to signal in the bitstream the motion vector difference (MVD) between the CPMVs of the current CU and their predictor CPMVPs together with the index of the predictors and the index of the selected reference picture for each of the applicable prediction directions.

In the case of a 4-parameter affine model, video encoder 200 signals two MVDs per applicable prediction direction. In the case of a 6-parameter affine model, video encoder 200 signals three MVDs per applicable prediction direction. When coding the second and third MVD (in case of 6-parameter affine), the second or third MVD is further predicted by the first MVD. Therefore, the difference between second and first MVD instead of the second MVD is signaled in the bitstream, and the difference between third and first MVD instead of the third MVD is signaled in the bitstream for the 6-parameter affine. Note that video encoder 200 signals the inter prediction direction beforehand to indicate whether the prediction direction is bi-prediction, uni-prediction from reference picture list 0, or uni-prediction from reference picture list 1.

In VVC, the affine AVMP candidate list size is generated by using the following four types of CPMVP candidates, in order:

Inherited affine AMVP candidates that are extrapolated from the CPMVs of the neighbour CUs Constructed affine AMVP candidates CPMVPs that are derived using the translational MVs of the neighbour CUs Translational MVs from neighboring CUs Zero MVs In one example, the checking order of inherited affine AMVP candidates is the same as the checking order of inherited affine merge candidates. The only difference is that, for an AVMP candidate, only affine CUs that have the same reference picture as the current block are considered. In one example, no pruning process is applied when inserting an inherited affine motion predictor into the candidate list.

Video encoder 200 and video decoder 300 may derive constructed AMVP candidates from the specified spatial neighbors. In one example, the same checking order is used as is used for affine merge candidate construction. In addition, the reference picture index of the neighboring block may also be checked. The first block in the checking order that is inter coded and has the same reference picture as the current CUs is used. When the current CU is coded with 4-parameter affine mode, and $mv_0$ and $mv_1$ are both available, $mv_0$ and $mv_1$ are added as one candidate in the affine AMVP list. When the current CU is coded with 6-parameter affine mode, and all three CPMVs are available, all three CPMVs are added as one candidate in the affine AMVP list. Otherwise, the constructed AMVP candidate is set as unavailable.

If the affine AMVP candidate list is still less than maximum number after valid inherited affine AMVP candidates and constructed AMVP candidate are inserted, $mv_0$, $mv_1$, and $mv_2$ will be added, in order, as the translational MVs to predict all control point MVs of the current CU, when available. Finally, zero MVs are used to fill the affine AMVP list if it is still not full (e.g., less than a predetermined number of candidates).

Bilateral Matching AMVP-Merge Mode in the Enhanced Compression Mode (ECM)

A bi-directional predictor is composed of an AMVP predictor in one direction and a merge predictor in the other direction. As such, for one prediction direction, video encoder 200 may signal an MVD and an AMVP index, while for the other prediction direction, video encoder 200 may signal a merge index.

The bilateral matching AMVP-merge mode can be enabled for a coding block when the selected merge predictor and the AMVP predictor satisfy decoder-side motion vector refinement (DMVR) conditions, where there is at least one reference picture from the past and one reference picture from the future relative to the current picture and the distances from two reference pictures to the current picture are the same. Bilateral matching MV refinement may be applied for the merge MV candidate and an AMVP MVP as a starting point. Otherwise, if template matching functionality is enabled, template matching MV refinement may be applied to the merge predictor or the AMVP predictor which has a higher template matching cost. An example process for the AMVP-merge mode is illustrated in FIG. 4.

Figure 4:
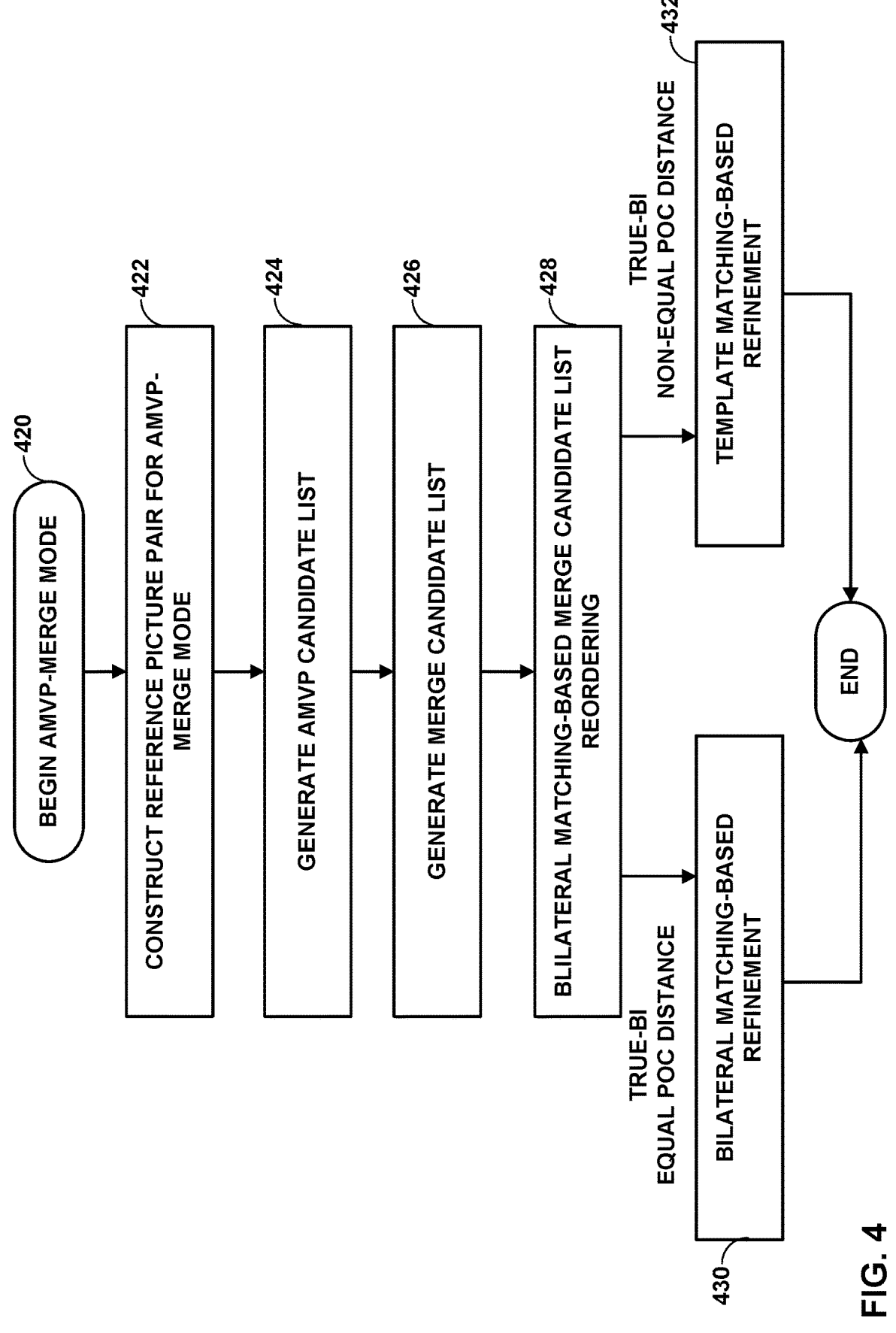
FIG. 4 is a flowchart illustrating an example of AMVP-Merge mode.

In FIG. 4, the AMVP-merge mode process begins at 420. Then video encoder 200 and video decoder 300 may construct a reference picture pair for the AMVP-merge mode (422). Video encoder 200 and video decoder 300 may generate an AMVP candidate list (424) for one prediction direction, and may generate a merge candidate list (426) for the other prediction direction. In some examples, video encoder 200 and video decoder 300 may perform bilateral matching-based merge candidate list reordering (428) on the AMVP candidate list and/or the merge candidate list. Video encoder 200 and video decoder 300 may perform bilateral matching-based refinement (430) if the candidates have equal POC distance, and may perform template matching-based refinement if the candidates have unequal POC distance (432). The term "true-bi equal POC distance" refers to the situation where one reference picture has a POC that is less than the POC of the current picture, and the other reference picture has a POC that is greater than the POC of the current picture.

The AMVP part of the bilateral matching AMVP-merge mode is signaled as a regular uni-directional AMVP, e.g., reference index and MVD are signaled, and it has a derived MVP index if template matching is used or MVP index is signaled when template matching is disabled.

For AMVP direction LX, where X can be 0 or 1, the merge part in the other direction (1–LX) is implicitly derived by minimizing the bilateral matching cost between the AMVP predictor and a merge predictor, e.g., for a pair of the AMVP and merge motion vectors. For merge candidates in the merge candidate list which has the other prediction direction (e.g., 1–LX) motion vector, the bilateral matching cost is calculated using the merge candidate MV and the AMVP MV. The merge candidate with the smallest cost is selected. Bilateral matching refinement is applied to the coding block with the selected merge candidate MV and the AMVP MV as a starting point.

The third pass of multi pass DMVR which is 8×8 sub-PU bi-directional optical flow (BDOF) refinement of the multi-pass DMVR is enabled to AMVP-merge mode coded block.

The bilateral matching AMVP-merge mode is indicated by a flag if the mode is enabled. The AMVP direction LX is further indicated by a flag.

Examples

This disclosure describes the following techniques that improve the coding and/or signaling efficiency when coding video data using affine motion model. The following techniques may be used independently or together in any combination.

Affine AMVP Mode with One MVD

In one example of the disclosure, video encoder 200 and video decoder 300 may be configured to code a flag (e.g., named affine1MvdFlag) for the 6-parameter affine AMVP mode to indicate whether the second and third MVDs are both equal to the first MVD for the first CPMV. If so, video encoder 200 and video decoder 300 need not code any bits for the second MVD for the second CPMV and the third MVD for the third CPMV.

For example, if video encoder 200 encodes the affine1MvdFlag to have a value of zero, this indicates that the second MVD and the third MVD do not equal the first MVD. Video encoder 200 would then proceed to encode syntax elements indicating the values of the first MVD, second MVD, and third MVD. If video decoder 300 decodes the affine1MvdFlag and determines that the value is zero (e.g., indicating that the second and third MVDs do not equal the first MVD), video decoder 300 would then proceed to decode syntax elements indicating the values of the first MVD, second MVD, and third MVD. If video encoder 200 encodes the affine1MvdFlag to have a value of one, this indicates that the second and third MVDs do have values equal to the first MVD. Video encoder 200 would then proceed to encode one or more syntax elements only indicating the value of the first MVD. If video decoder 300 decodes the affine1MvdFlag and determines that the value is one (e.g., indicating that the second and third MVDs do have values equal to the first MVD), video decoder 300 would then proceed to decode one or more syntax elements indicating the values of the first MVD and would then set the values of the second MVD and the third MVD to be equal to the value determined for the first MVD. In the above example, the meaning of the values for the affine1MvdFlag may be reversed.

In general, video encoder 200 may be configured to receive a block of video data to be encoded using a 6-parameter affine AMVP mode, determine a first MVD for a first CPMV for the block, determine a second MVD for a second CPMV for the block, determine a third MVD for a third CPMV for the block, encode the block of video data using the first MVD, the second MVD, and the third MVD, encode a first syntax element indicating the first MVD for the block, and encode a flag that indicates if the second MVD and the third MVD for the block are equal to the first MVD. In a reciprocal fashion, video decoder 300 may be configured to receive a block of video data to be decoded using a 6-parameter affine AMVP mode, decode a first syntax element indicating a first MVD for a first CPMV for the block, decode a flag that indicates if a second MVD for a second CPMV for the block and a third MVD for a third CPMV for the block are equal to the first MVD, determine the second MVD and the third MVD based on the flag, and decode the block of video data using the first MVD, the second MVD, and the third MVD to generate a decoded block.

When the second MVD and the third MVD are equal to the first MVD, video encoder 200 is configured to refrain from encoding a second syntax element indicating the second MVD for the second CPMV of the block, and refrain from encoding a third syntax element indicating the third MVD for the third CPMV of the block. When the second MVD and the third MVD are not equal to the first MVD, video encoder 200 is configured to encode a second syntax element indicating the second MVD for the second CPMV of the block, and encode a third syntax element indicating the third MVD for the third CPMV of the block.

In a reciprocal fashion, when the flag (affine1MvdFlag) indicates the second MVD and the third MVD are equal to the first MVD, video decoder 300 is configured to set the second MVD to be equal to the first MVD, and set the third MVD to be equal to the first MVD (e.g., without receiving specific syntax elements for the second MVD and the third MVD). When the flag indicates the second MVD and the third MVD are not equal to the first MVD, video decoder 300 is configured to decode a second syntax element indicating the second MVD for the second CPMV of the block, and decode a third syntax element indicating the third MVD for the third CPMV of the block.

In a further example, the flag affine1MvdFlag is shared by both prediction directions. Therefore, in the case of bi-prediction, video encoder 200 and video decoder 300 only code one affine1MvdFlag flag for the 6-parameter affine AMVP mode. Accordingly, in this example, video encoder 200 and video decoder 300 may be configured to encode/decode a single flag that indicates if the second MVD for the second CPMV for the block and the third MVD for a third CPMV for the block are equal to the first MVD, wherein the single flag is applicable to both prediction directions for the 6-parameter bi-directional AMVP mode In another example, video encoder 200 and video decoder 300 are configured to code the flag affine1MvdFlag for each prediction direction. Video encoder 200 and video decoder 300 would code the first MVD for each prediction direction as well as the affine1MvdFlag for each prediction direction. Video encoder 200 and video decoder 300 may be configured to flexibly code or not to code the second and third MVDs for the 6-parameter affine AMVP mode. Accordingly, in this example, video encoder 200 and video decoder 300 may encode/decode a first flag for a first prediction direction that indicates if the second MVD for the second CPMV for the block and the third MVD for a third CPMV for the block are equal to the first MVD, and encode/decode a second flag for a second prediction direction that indicates if the second MVD for the second CPMV for the block and the third MVD for a third CPMV for the block are equal to the first MVD.

In another example, video encoder 200 and video decoder 300 are configured to code the flag affine1MvdFlag for the bi-prediction 6-parameter affine AMVP mode. If the flag is true (e.g., the second MVD and third MVD equal the first MVD), only one MVD for the reference picture list 0 is signaled in the bitstream. In this example, video decoder 300 may be configured to infer that all the MVDs (including the first MVD) for reference picture list 1 are zeros. Accordingly, in this example, video encoder 200 is configured to refrain from encoding a second syntax element indicating the second MVD for the second CPMV of the block, refrain from encoding a third syntax element indicating the third MVD for the third CPMV of the block, refrain from encoding any syntax elements for MVDs for a second prediction direction, and set all MVDs to zero for the second prediction direction. In a reciprocal fashion, video decoder 300 is configured to determine the first MVD to be for a first prediction direction, set the second MVD to be equal to the first MVD for the first prediction direction, set the third MVD to be equal to the first MVD for the first prediction direction, and set all MVDs to zero for a second prediction direction.

In yet another example, video encoder 200 and video decoder 300 are configured to code the flag affine1MvdFlag for the bi-prediction 6-parameter affine AMVP mode. If the flag is true (e.g., the second MVD and third MVD equal the first MVD), only the first MVD for the reference picture list 0 is signaled in the bitstream. Video encoder 200 and video decoder 300 may be configured to implicitly derive the first MVD for the reference picture list 1 is from the first MVD for the reference picture list 0. For example, video encoder 200 and video decoder 300 may derive the first MVD for the reference picture list 1 by scaling the first MVD for the reference picture list 0 according to the distances (e.g., POC distance) between current picture, and the reference pictures in reference picture list 0 and reference picture list 1.

Accordingly, in this example, video encoder 200 may determine the first MVD to be for a first prediction direction, set the second MVD to be equal to the first MVD for the first prediction direction, and set the third MVD to be equal to the first MVD for the first prediction direction. Video encoder 200 may further derive a first MVD for a second prediction direction from the first MVD for the first prediction direction (e.g., using scaling), set a second MVD for the second prediction direction to be equal to the first MVD for the second prediction direction, and set a third MVD for the second prediction direction to be equal to the first MVD for the second prediction direction.

In a reciprocal fashion, video decoder 300 may determine the first MVD to be for a first prediction direction, set the second MVD to be equal to the first MVD for the first prediction direction, and set the third MVD to be equal to the first MVD for the first prediction direction. Video decoder 300 may further derive a first MVD for a second prediction direction from the first MVD for the first prediction direction (e.g., using scaling), set a second MVD for the second prediction direction to be equal to the first MVD for the second prediction direction, and set a third MVD for the second prediction direction to be equal to the first MVD for the second prediction direction.

Video encoder 200 and video decoder 300 may be configured to code the affine1Mvdflag after coding of the first MVD. In one example, the affine1MvdFlag is not signaled and is inferred to be zero if the first MVD is zero.

In another example, whether the first MVD is zero is used to derive the CABAC context for coding the affine1Mvd flag. For example, a first CABAC context is used when the first MVD is zero, and a second CABAC context is used when the first MVD is not zero. In other examples, the block size of the current block can be used to derive the CABAC context for coding affine1MvdFlag.

High level syntax, for example a flag in the sequence parameter set, picture parameter set, picture header, or slice header, may be used to indicate whether the affine AMVP mode with one MVD is used or not (e.g., if the affine1MvdFlag will be used). If such a flag indicating the AMVP mode with one MVD is false, video encoder 200 does not signal the affine1MvdFlag and video decoder 300 infers the affine1MvdFlag to be false.

In some examples, a size constraint may be applied for using the AMVP mode with one MVD. In one example, the affine AMVP mode with one MVD is only enabled for a coding block that has both a width and a height less than or equal to a predefined threshold. For example, the threshold may be 16, 32, or another value. The height/width threshold may be signaled in high level syntax. In another example, the affine AMVP mode one MVD is only enabled for a coding block that has an area less than or equal to a predefined threshold, for example, 256, 512, or another value. The area threshold may be signaled in high level syntax.

Affine AMVP-Merge Mode

In another example of the disclosure, when a block is determined to be coded with AMVP-merge mode, video encoder 200 and video decoder 300 may code an affine flag to indicate whether the block is coded with affine mode. When a block is determined to be coded by affine AMVP-merge mode, video encoder 200 and video decoder 300 may further code a flag that indicates the AMVP direction LX.

In one example, the AMVP part of the affine AMVP-merge mode is coded as a regular uni-directional affine AMVP. For example, video encoder 200 and video decoder 300 may code syntax elements that indicate the affine type (e.g., 4 or 6 parameters affine model), reference index, MVP index, and MVD.

In another example, the AMVP part of affine AMVP-merge mode determines all MVDs to be zero. In other words, video decoder 300 may be configured to derive the MVDs to be zero, without any signaling in the bitstream, for the AMVP part for the affine AMPV-merge mode.

In another example, video decoder 300 may be configured to determine the affine type to be the 4 parameters affine model without signaling in bitstream. In this example, the merge part candidate which has a 6 parameters affine model is converted to 4 parameters affine model by discarding the third CPMV.

In another example, video decoder 300 is configured to determine the affine type to be the 6 parameters affine model without signaling in bitstream. In this example, the merge part candidate which has a 4 parameters affine model is converted to 6 parameters affine model, as follows:

```
iDMvHorX = (rcMv[1]− rcMv[0]).getHor( ) << (shift −
floorLog2(curW));
iDMvHorY = (rcMv[1]− rcMv[0]).getVer( ) << (shift −
floorLog2(curW));
iDMvVerX = −iDMvHorY;
iDMvVerY = iDMvHorX;
int iMvScaleHor = rcMv[0].getHor( ) << shift;
int iMvScaleVer = rcMv[0].getVer( ) << shift;
int horTmp, verTmp;
{
   horTmp = iMvScaleHor + iDMvHorX * (0) + iDMvVerX * (curH);
   verTmp = iMvScaleVer + iDMvHorY * (0) + iDMvVerY * (curH );
   roundAffineMv( horTmp, verTmp, shift );
   rcMv[2].hor = horTmp;
   rcMv[2].ver = verTmp;
   rcMv[2].clipToStorageBitDepth( );
}
```

Wherein, rcMv[0] and rcMv[1] are the first two CPMVs, rcMv[2] is the derived CPMV. The values of curH and curW represent the current block dimension (e.g., the block height blkH and block width blkW). Referring the affine motion model parameter equations described above, iDMvHorX is parameter 'a' and iDMvHorY is parameter 'b'. The function 'shift' is a normalization step for integer calculations which is set to the log 2 of the maximum block size. The function 'getHor( ) obtains the x component of the motion vector, and the function 'getVer( ) obtains the y component of the motion vector. The function roundAffineMv(horTmp, verTmp, shift) performs a right shift of horTmp and verTmp by the mount of "shift" bits. Since iMvScaleHor and iMvScalever (corresponding to $v_{ox}$ and $v_{oy}$) are previously left shifted by "shift" bits. horTmp and verTmp basically are the values of the x and y component of the 3rd CPMV. Note the coordinate of the 3rd CPMV is (0, curH), therefore:

$$horTmp = iMvScaleHor + iDMvHorX * (0) + iDMvVerX * (curH);$$

$$verTmp = iMvScaleVer + iDMvHorY * (0) + iDMvVerY * (curH);$$

clipToStorageBitDepth( ) is the value of the motion vector clipped to a certain dynamic range (17 bits for example) for storage purpose.

In another example, video encoder 200 and video decoder 300 may determine that a candidate is a valid merge candidate if the candidate is associated with a reference block at a reference picture RefPic_merge (the reference picture of a merge candidate), in reference picture list (1–LX). In one example, RefPic_merge and RefPic_amvp (the reference picture of an AMVP candidate) are from different sides (e.g., past or future) relative to the current picture.

In another example, video encoder 200 and video decoder 300 may construct a candidate pair list by pairing the AMVP part candidate with all valid merge candidates.

In another example, when the candidate pair list has more than one candidate pair, video encoder 200 and video decoder 300 may be configured to reorder the first N candidate pairs in the list by prioritizing a minimum template matching cost. In another example, video encoder 200 and video decoder 300 may be configured to reorder the first M candidate pairs by prioritizing minimum bilateral matching cost. M and N may be the same value of different values.

In another example, when RefPic_merge and RefPic_amvp has same the distance to the current picture (e.g., same POD distance), video encoder 200 and video decoder 300 may be configured to further refine the MVs by minimizing a bilateral matching cost in a predefined search area.

Video encoder 200 and video decoder may be configured to select the first candidate pair in the list to derive the merge part predictor and to derive the AMVP part MVP information for the affine AMVP-merge mode coded block.

In another example, video encoder 200 and video decoder 300 may be configured to enable the affine AMVP-merge mode at a current picture when all or a subset of following enabling conditions are satisfied:

There is at least one pair of reference pictures where one reference picture is in the past and the other reference picture is in the future relative to the current picture.

Both reference pictures have the same resolution as the current picture.

Both reference pictures are not long-term reference pictures.

In one example, when a block is determined to be coded as AMVP-merge mode, video encoder 200 and video decoder 300 may be configured to determine that the block is an affine coded block without additional signaling. Video encoder 200 and video decoder 300 may convert a translational candidate, either from the AMVP part or from the merge part, to be 4 or 6 parameters affine model.

Affine Flag Checking in the Constructed Affine Motion Predictor

In another example of the disclosure, when deriving the affine mode candidates or sub-block affine mode candidates using neighbor block information, video encoder 200 and video decode 300 may perform a check of whether a neighboring block is coded using affine mode or sub-block affine mode may be performed. In one example, based on the check, video encoder 200 and video decode 300 may give priority to blocks coded with affine mode or sub-block affine mode in the derivation of the candidates. In one example, a block coded with affine mode or sub-block affine mode may be identified and used first to derive the affine mode candidate or sub-block affine mode candidates. If such neighboring blocks are not enough (for example, the number of derived candidates using neighbor affine mode or sub-block affine mode blocks is less then the candidate list size) then the neighbor blocks coded with regular inter mode may be used to the derive the remaining candidates.

Such candidates may be used in affine merge, affine AMVP, regression based affine mode and other modes where neighboring blocks are used to derive candidates.

In another example of the disclosure, the following described method applies to each of the control point. In one example, video encoder 200 and video decode 300 may use the neighboring motion information only if the affine flag is true at the neighboring block. In another example, video encoder 200 and video decode 300 may first use the neighboring motion information from the neighboring block that has affine flag being true to construct the affine candidate. Then, if the affine flag is false in all the neighboring blocks, video encoder 200 and video decode 300 may use the neighboring motion information from the first available inter coded block.

Figure 5:
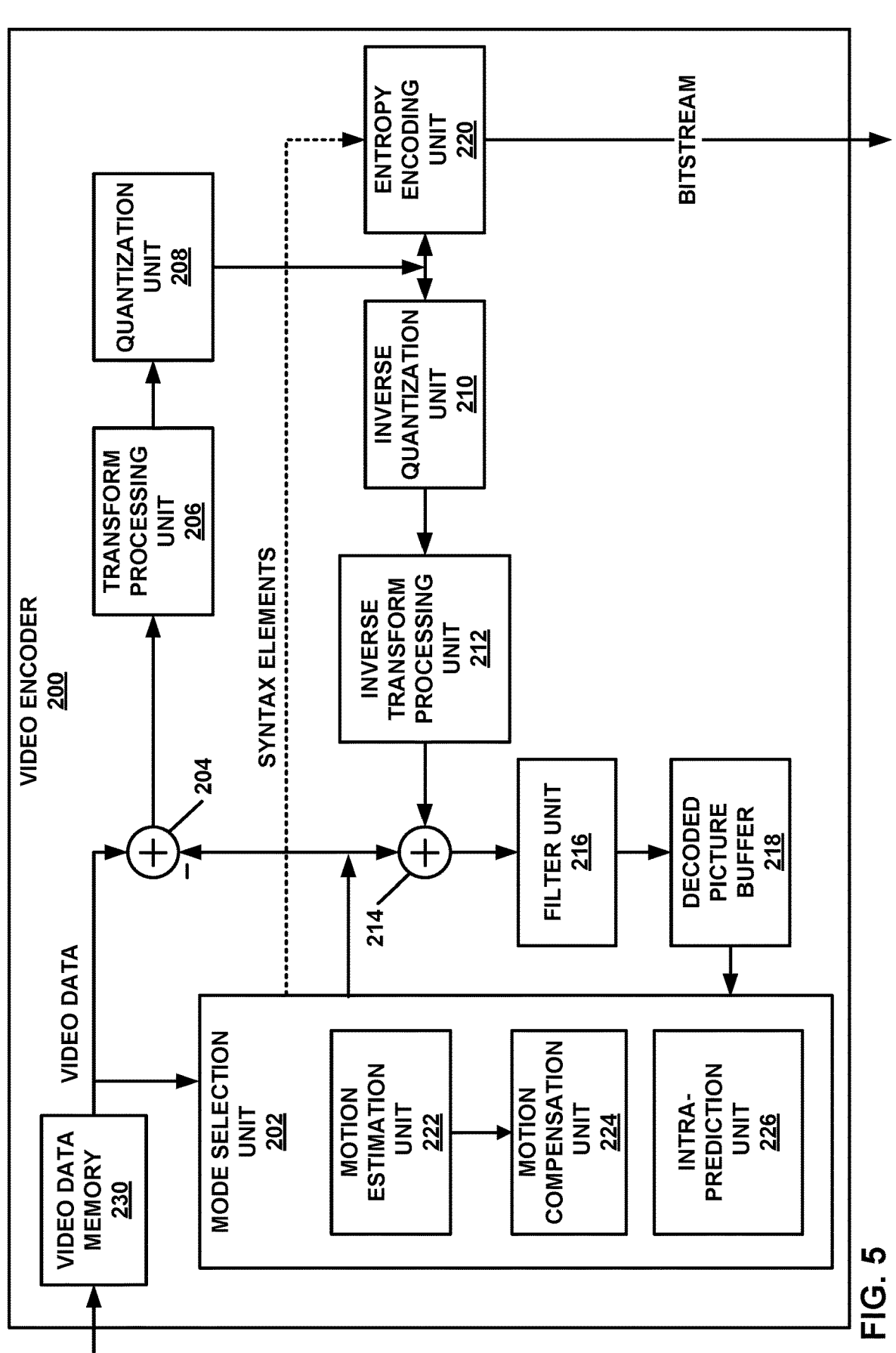
FIG. 5 is a block diagram illustrating an example video encoder that may perform the techniques of this disclosure.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUS, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neigh-boring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform one or more techniques of this disclosure for coding blocks of video data using affine mode. For example, video encoder 200 may receive a block of video data to be encoded using a 6-parameter affine AMVP mode, determine a first MVD for a first CPMV for the block, determine a second MVD for a second CPMV for the block, determine a third MVD for a third CPMV for the block, encode the block of video data using the first MVD, the second MVD, and the third MVD, encode a first syntax element indicating the first MVD for the block, and encode a flag that indicates if the second MVD and the third MVD for the block are equal to the first MVD.

Figure 6:
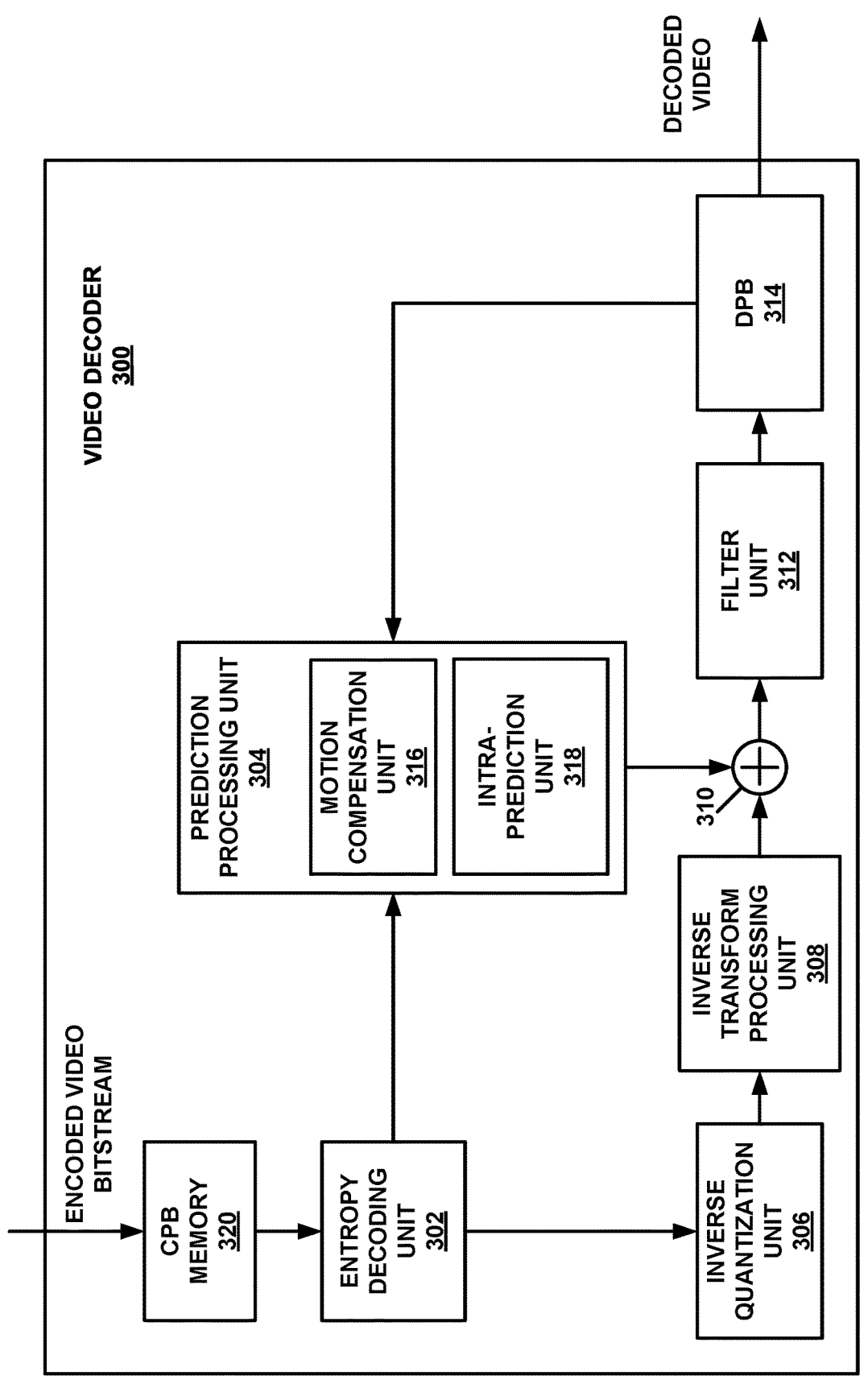
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform one or more techniques of this disclosure for coding blocks of video data using affine mode. For example, video decoder 300 may receive a block of video data to be decoded using a 6-parameter affine AMVP mode, decode a first syntax element indicating a first MVD for a first CPMV for the block, decode a flag that indicates if a second MVD for a second CPMV for the block and a third MVD for a third CPMV for the block are equal to the first MVD, determine the second MVD and the third MVD based on the flag, and decode the block of video data using the first MVD, the second MVD, and the third MVD to generate a decoded block.

Figure 7:
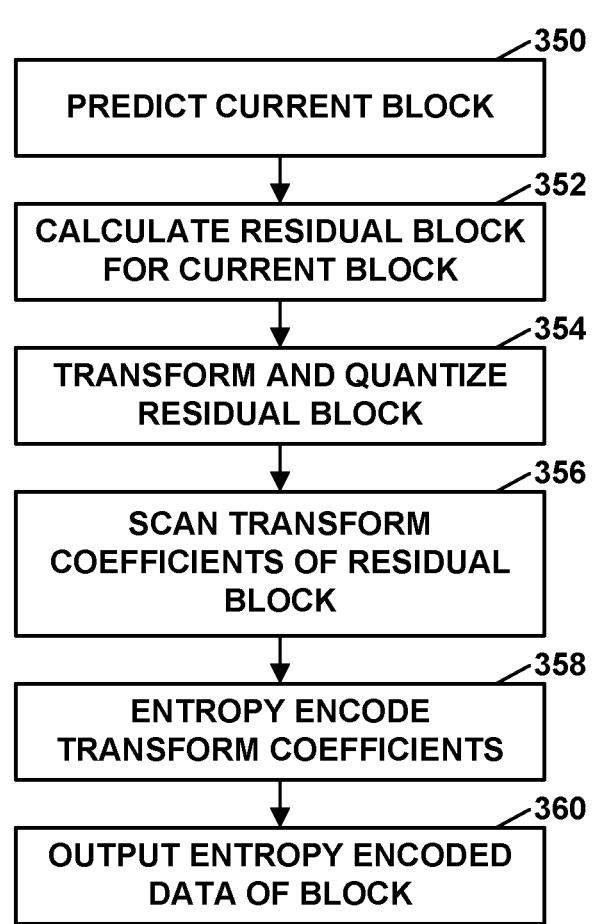
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may be or include a current CU. Although described with respect to video encoder 200 (FIGS. 1 and 5), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 8:
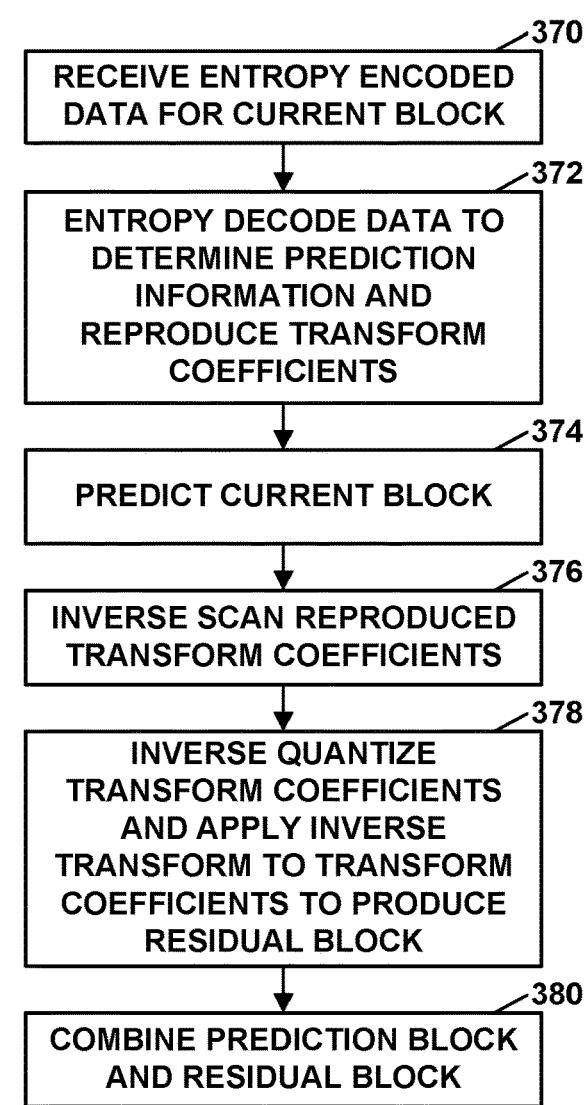
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may be or include a current CU. Although described with respect to video decoder 300 (FIGS. 1 and 6), it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378).

Video decoder 300 may ultimately decode the current block by combining the prediction block and the residual block (380).

FIG. 9 is a flowchart illustrating another example method for encoding a current block in accordance with the techniques of this disclosure. The techniques of FIG. 9 may be performed by one or more components of video encoder 200, including motion estimation unit 222 and motion compensation unit 224.

In one example of the disclosure, video encoder 200 may receive a block of video data to be encoded using a 6-parameter affine advanced motion vector predictor (AMVP) mode (900). Video encoder 200 may determine a first motion vector difference (MVD) for a first control point motion vector (CPMV) for the block (902), determine a second MVD for a second CPMV for the block (904), and determine a third MVD for a third CPMV for the block (906). Video encoder 200 may further encode the block of video data using the first MVD, the second MVD, and the third MVD (908). Video encoder 200 may further be configured to encode a first syntax element indicating the first MVD for the block (910), and encode a flag that indicates if the second MVD and the third MVD for the block are equal to the first MVD (912).

In one example, where the second MVD and the third MVD are equal to the first MVD, video encoder 200 is further configured to refrain from encoding a second syntax element indicating the second MVD for the second CPMV of the block, and refrain from encoding a third syntax element indicating the third MVD for the third CPMV of the block. In another example, where the second MVD and the third MVD are not equal to the first MVD, video encoder 200 is configured to encode a second syntax element indicating the second MVD for the second CPMV of the block, and encode a third syntax element indicating the third MVD for the third CPMV of the block.

In an example where the 6-parameter AMVP mode is a 6-parameter bi-directional AMVP mode, video encoder 200 is configured to encode a single flag that indicates if the second MVD for the second CPMV for the block and the third MVD for a third CPMV for the block are equal to the first MVD, wherein the single flag is applicable to both prediction directions for the 6-parameter bi-directional AMVP mode.

In an example where the 6-parameter AMVP mode is a 6-parameter bi-directional AMVP mode, video encoder 200 is configured to encode a first flag for a first prediction direction that indicates if the second MVD for the second CPMV for the block and the third MVD for a third CPMV for the block are equal to the first MVD, and encode a second flag for a second prediction direction that indicates if the second MVD for the second CPMV for the block and the third MVD for a third CPMV for the block are equal to the first MVD.

In an example where the 6-parameter AMVP mode is a 6-parameter bi-directional AMVP mode, and the second MVD and the third MVD are equal to the first MVD, video encoder 200 is configured to refrain from encoding a second syntax element indicating the second MVD for the second CPMV of the block, refrain from encoding a third syntax element indicating the third MVD for the third CPMV of the block, refrain from encoding any syntax elements for MVDs for a second prediction direction, and set all MVDs to zero for the second prediction direction.

In an example where the 6-parameter AMVP mode is a 6-parameter bi-directional AMVP mode, and the second MVD and the third MVD are equal to the first MVD, video encoder 200 is configured to determine the first MVD to be for a first prediction direction, set the second MVD to be equal to the first MVD for the first prediction direction, set the third MVD to be equal to the first MVD for the first prediction direction, derive a first MVD for a second prediction direction from the first MVD for the first prediction direction, set a second MVD for the second prediction direction to be equal to the first MVD for the second prediction direction, and set a third MVD for the second prediction direction to be equal to the first MVD for the second prediction direction.

FIG. 10 is a flowchart illustrating another example method for decoding a current block in accordance with the techniques of this disclosure. The techniques of FIG. 10 may be performed by one or more components of video decoder 300, including motion compensation unit 316.

Video decoder 300 may be configured to receive a block of video data to be decoded using a 6-parameter affine advanced motion vector predictor (AMVP) mode (950), and decode a first syntax element indicating a first motion vector difference (MVD) for a first control point motion vector (CPMV) for the block (952). Video decoder 300 may be further configured to decode a flag that indicates if a second MVD for a second CPMV for the block and a third MVD for a third CPMV for the block are equal to the first MVD (954). Video decoder may further determine the second MVD and the third MVD based on the flag (956), and decode the block of video data using the first MVD, the second MVD, and the third MVD to generate a decoded block (958).

In one example where the flag indicates the second MVD and the third MVD are equal to the first MVD, video decoder 300 is configured to set the second MVD to be equal to the first MVD, and set the third MVD to be equal to the first MVD. In an example where the flag indicates the second MVD and the third MVD are not equal to the first MVD, video decoder 300 is configured to decode a second syntax element indicating the second MVD for the second CPMV of the block, and decode a third syntax element indicating the third MVD for the third CPMV of the block.

In an example where the 6-parameter AMVP mode is a 6-parameter bi-directional AMVP mode, video decoder 300 is configured to decode a single flag that indicates if the second MVD for the second CPMV for the block and the third MVD for a third CPMV for the block are equal to the first MVD, wherein the single flag is applicable to both prediction directions for the 6-parameter bi-directional AMVP mode.

In an example where the 6-parameter AMVP mode is a 6-parameter bi-directional AMVP mode, video decoder 300 is configured to decode a first flag for a first prediction direction that indicates if the second MVD for the second CPMV for the block and the third MVD for a third CPMV for the block are equal to the first MVD, and decode a second flag for a second prediction direction that indicates if the second MVD for the second CPMV for the block and the third MVD for a third CPMV for the block are equal to the first MVD.

In an example where the 6-parameter AMVP mode is a 6-parameter bi-directional AMVP mode, and the flag indicates the second MVD and the third MVD are equal to the first MVD, video decoder 300 is configured to determine the first MVD to be for a first prediction direction, set the second MVD to be equal to the first MVD for the first prediction direction, set the third MVD to be equal to the first MVD for the first prediction direction, and set all MVDs to zero for a second prediction direction.

In an example where the 6-parameter AMVP mode is a 6-parameter bi-directional AMVP mode, and the flag indicates the second MVD and the third MVD are equal to the first MVD, video decoder 300 is configured to determine the first MVD to be for a first prediction direction, set the second MVD to be equal to the first MVD for the first prediction direction, set the third MVD to be equal to the first MVD for the first prediction direction, derive a first MVD for a second prediction direction from the first MVD for the first prediction direction, set a second MVD for the second prediction direction to be equal to the first MVD for the second prediction direction, and set a third MVD for the second prediction direction to be equal to the first MVD for the second prediction direction.

The following numbered clauses illustrate one or more aspects of the devices and techniques described in this disclosure.

Aspect 1A. A method of coding video data, the method comprising: coding a flag for a block of video data coded using a 6-parameter affine advanced motion vector predictor (AMVP) mode, wherein the flag indicates if a second motion vector difference (MVD) and a third MVD are equal to a first MVD; and coding the block of video data in accordance with the flag.

Aspect 2A. The method of Aspect 1A, further comprising, based on the flag being true: coding the first MVD; not coding the second MVD; and not coding the third MVD.

Aspect 3A. The method of Aspect 1A, further comprising: coding the flag for both prediction directions.

Aspect 4A. The method of Aspect 1A, further comprising: coding separate instances of the flag for two or more prediction directions.

Aspect 5A. The method of Aspect 1A, further comprising: coding the flag after coding the first MVD.

Aspect 6A. A method of coding video data, the method comprising: determining that a block is coded using AMVP-merge mode; and coding a flag that indicates whether the block is coded using an affine mode.

Aspect 7A. The method of Aspect 6A, wherein the flag indicates the block is coded using the affine mode, the method further comprising: coding a syntax element indicating an AMVP direction.

Aspect 8A. The method of Aspect 6A, further comprising: coding the AMVP part of the AMVP-merge mode as a regular uni-directional affine AMVP.

Aspect 9A. The method of Aspect 6A, further comprising: inferring all MVDs for the AMVP-merge mode to be zero.

Aspect 10A. A method of coding video data, the method comprising: checking whether one or more neighbor blocks to a current block is coded using affine mode or sub-block mode; and based on the check, deriving sub-block mode candidates using neighbor block information, wherein the one or more neighbor blocks coded using the affine mode or the sub-block mode have a higher priority to be one of the sub-block mode candidates Aspect 11A. Any combination of techniques described in this disclosure Aspect 12A. The method of any of Aspects 1A-11A wherein coding comprises decoding.

Aspect 13A. The method of any of Aspects 1A-12A, wherein coding comprises encoding.

Aspect 14A. A device for coding video data, the device comprising one or more means for performing the method of any of Aspects 1A-11A.

Aspect 15A. The device of Aspect 14A, wherein the one or more means comprise one or more processors implemented in circuitry.

Aspect 16A. The device of any of Aspects 14A and 15A, further comprising a memory to store the video data.

Aspect 17A. The device of any of Aspects 14A-16A, further comprising a display configured to display decoded video data.

Aspect 18A. The device of any of Aspects 14A-17A, wherein the device comprises one or more of a camera, a computer, a mobile device, a broadcast receiver device, or a set-top box.

Aspect 19A. The device of any of Aspects 14A-18A, wherein the device comprises a video decoder.

Aspect 20A. The device of any of Aspects 14A-19A, wherein the device comprises a video encoder.

Aspect 21A. A computer-readable storage medium having stored thereon instructions that, when executed, cause one or more processors to perform the method of any of Aspects 1A-11A.

Aspect 1B. A method of decoding video data, the method comprising: receiving a block of video data to be decoded using a 6-parameter affine advanced motion vector predictor (AMVP) mode; decoding a first syntax element indicating a first motion vector difference (MVD) for a first control point motion vector (CPMV) for the block; decoding a flag that indicates if a second MVD for a second CPMV for the block and a third MVD for a third CPMV for the block are equal to the first MVD; determining the second MVD and the third MVD based on the flag; and decoding the block of video data using the first MVD, the second MVD, and the third MVD to generate a decoded block.

Aspect 2B. The method of Aspect 1B, wherein the flag indicates the second MVD and the third MVD are equal to the first MVD, and wherein determining the second MVD and the third MVD based on the flag comprises: setting the second MVD to be equal to the first MVD; and setting the third MVD to be equal to the first MVD.

Aspect 3B. The method of Aspect 1B, wherein the flag indicates the second MVD and the third MVD are not equal to the first MVD, and wherein determining the second MVD and the third MVD based on the flag comprises: decoding a second syntax element indicating the second MVD for the second CPMV of the block; and decoding a third syntax element indicating the third MVD for the third CPMV of the block.

Aspect 4B. The method of any of Aspects 1B-3B, wherein the 6-parameter AMVP mode is a 6-parameter bi-directional AMVP mode, and wherein decoding the flag comprises: decoding a single flag that indicates if the second MVD for the second CPMV for the block and the third MVD for a third CPMV for the block are equal to the first MVD, wherein the single flag is applicable to both prediction directions for the 6-parameter bi-directional AMVP mode.

Aspect 5B. The method of any of Aspects 1B-3B, wherein the 6-parameter AMVP mode is a 6-parameter bi-directional AMVP mode, and wherein decoding the flag comprises: decoding a first flag for a first prediction direction that indicates if the second MVD for the second CPMV for the block and the third MVD for a third CPMV for the block are equal to the first MVD; and decoding a second flag for a second prediction direction that indicates if the second MVD for the second CPMV for the block and the third MVD for a third CPMV for the block are equal to the first MVD.

Aspect 6B. The method of any of Aspects 1B-3B, wherein the 6-parameter AMVP mode is a 6-parameter bi-directional AMVP mode, wherein the flag indicates the second MVD and the third MVD are equal to the first MVD, and wherein the method further comprises: determining the first MVD to be for a first prediction direction; setting the second MVD to be equal to the first MVD for the first prediction direction; setting the third MVD to be equal to the first MVD for the first prediction direction; and setting all MVDs to zero for a second prediction direction.

Aspect 7B. The method of any of Aspects 1B-3B, wherein the 6-parameter AMVP mode is a 6-parameter bi-directional AMVP mode, wherein the flag indicates the second MVD and the third MVD are equal to the first MVD, and wherein the method further comprises: determining the first MVD to be for a first prediction direction; setting the second MVD to be equal to the first MVD for the first prediction direction; setting the third MVD to be equal to the first MVD for the first prediction direction; deriving a first MVD for a second prediction direction from the first MVD for the first prediction direction; setting a second MVD for the second prediction direction to be equal to the first MVD for the second prediction direction; and setting a third MVD for the second prediction direction to be equal to the first MVD for the second prediction direction.

Aspect 8B. An apparatus configured to decode video data, the apparatus comprising: a memory; and one or more processors implemented in circuitry and in communication with the memory, the one or more processors configured to: receive a block of video data to be decoded using a 6-parameter affine advanced motion vector predictor (AMVP) mode; decode a first syntax element indicating a first motion vector difference (MVD) for a first control point motion vector (CPMV) for the block; decode a flag that indicates if a second MVD for a second CPMV for the block and a third MVD for a third CPMV for the block are equal to the first MVD; determine the second MVD and the third MVD based on the flag; and decode the block of video data using the first MVD, the second MVD, and the third MVD to generate a decoded block.

Aspect 9B. The apparatus of Aspect 8B, wherein the flag indicates the second MVD and the third MVD are equal to the first MVD, and wherein to determine the second MVD and the third MVD based on the flag, the one or more processors are further configured to: set the second MVD to be equal to the first MVD; and set the third MVD to be equal to the first MVD.

Aspect 10B. The apparatus of Aspect 8B, wherein the flag indicates the second MVD and the third MVD are not equal to the first MVD, and wherein to determine the second MVD and the third MVD based on the flag, the one or more processors are further configured to: decode a second syntax element indicating the second MVD for the second CPMV of the block; and decode a third syntax element indicating the third MVD for the third CPMV of the block.

Aspect 11B. The apparatus of any of Aspects 8B-10B, wherein the 6-parameter AMVP mode is a 6-parameter bi-directional AMVP mode, and wherein to decode the flag, the one or more processors are further configured to: decode a single flag that indicates if the second MVD for the second CPMV for the block and the third MVD for a third CPMV for the block are equal to the first MVD, wherein the single flag is applicable to both prediction directions for the 6-parameter bi-directional AMVP mode.

Aspect 12B. The apparatus of Aspect 8B, wherein the 6-parameter AMVP mode is a 6-parameter bi-directional AMVP mode, and wherein to decode the flag, the one or more processors are further configured to: decode a first flag for a first prediction direction that indicates if the second MVD for the second CPMV for the block and the third MVD for a third CPMV for the block are equal to the first MVD; and decode a second flag for a second prediction direction that indicates if the second MVD for the second CPMV for the block and the third MVD for a third CPMV for the block are equal to the first MVD.

Aspect 13B. The apparatus of any of Aspects 8B-10B, wherein the 6-parameter AMVP mode is a 6-parameter bi-directional AMVP mode, wherein the flag indicates the second MVD and the third MVD are equal to the first MVD, and wherein the one or more processors are further configured to: determine the first MVD to be for a first prediction direction; set the second MVD to be equal to the first MVD for the first prediction direction; set the third MVD to be equal to the first MVD for the first prediction direction; and set all MVDs to zero for a second prediction direction.

Aspect 14B. The apparatus of any of Aspects 8B-10B, wherein the 6-parameter AMVP mode is a 6-parameter bi-directional AMVP mode, wherein the flag indicates the second MVD and the third MVD are equal to the first MVD, and wherein the one or more processors are further configured to: determine the first MVD to be for a first prediction direction; set the second MVD to be equal to the first MVD for the first prediction direction; set the third MVD to be equal to the first MVD for the first prediction direction; derive a first MVD for a second prediction direction from the first MVD for the first prediction direction; set a second MVD for the second prediction direction to be equal to the first MVD for the second prediction direction; and set a third MVD for the second prediction direction to be equal to the first MVD for the second prediction direction.

Aspect 15B. The apparatus of any of Aspects 8B-14B, further comprising: a display configured to display a picture that includes the decoded block.

Aspect 16B. A method of encoding video data, the method comprising: receiving a block of video data to be encoded using a 6-parameter affine advanced motion vector predictor (AMVP) mode; determining a first motion vector difference (MVD) for a first control point motion vector (CPMV) for the block; determining a second MVD for a second CPMV for the block; determining a third MVD for a third CPMV for the block; encoding the block of video data using the first MVD, the second MVD, and the third MVD; encoding a first syntax element indicating the first MVD for the block; and encoding a flag that indicates if the second MVD and the third MVD for the block are equal to the first MVD.

Aspect 17B. The method of Aspect 16B, wherein the second MVD and the third MVD are equal to the first MVD, and wherein the method further comprises: refraining from encoding a second syntax element indicating the second MVD for the second CPMV of the block; and refraining from encoding a third syntax element indicating the third MVD for the third CPMV of the block.

Aspect 18B. The method of Aspect 16B, wherein the second MVD and the third MVD are not equal to the first MVD, and wherein the method further comprises: encoding a second syntax element indicating the second MVD for the second CPMV of the block; and encoding a third syntax element indicating the third MVD for the third CPMV of the block.

Aspect 19B. The method of any of Aspects 16B-18B, wherein the 6-parameter AMVP mode is a 6-parameter bi-directional AMVP mode, and wherein encoding the flag comprises: encoding a single flag that indicates if the second MVD for the second CPMV for the block and the third MVD for a third CPMV for the block are equal to the first MVD, wherein the single flag is applicable to both prediction directions for the 6-parameter bi-directional AMVP mode.

Aspect 20B. The method of any of Aspects 16B-18B, wherein the 6-parameter AMVP mode is a 6-parameter bi-directional AMVP mode, and wherein encoding the flag comprises: encoding a first flag for a first prediction direction that indicates if the second MVD for the second CPMV for the block and the third MVD for a third CPMV for the block are equal to the first MVD; and encoding a second flag for a second prediction direction that indicates if the second MVD for the second CPMV for the block and the third MVD for a third CPMV for the block are equal to the first MVD.

Aspect 21B. The method of any of Aspects 16B-18B, wherein the 6-parameter AMVP mode is a 6-parameter bi-directional AMVP mode, wherein the second MVD and the third MVD are equal to the first MVD, and wherein the method further comprises: refraining from encoding a second syntax element indicating the second MVD for the second CPMV of the block; refraining from encoding a third syntax element indicating the third MVD for the third CPMV of the block; refraining from encoding any syntax elements for MVDs for a second prediction direction; and setting all MVDs to zero for the second prediction direction.

Aspect 22B. The method of any of Aspects 16B-18B, wherein the 6-parameter AMVP mode is a 6-parameter bi-directional AMVP mode, wherein the second MVD and the third MVD are equal to the first MVD, and wherein the method further comprises: determining the first MVD to be for a first prediction direction; setting the second MVD to be equal to the first MVD for the first prediction direction; setting the third MVD to be equal to the first MVD for the first prediction direction; deriving a first MVD for a second prediction direction from the first MVD for the first prediction direction; setting a second MVD for the second prediction direction to be equal to the first MVD for the second prediction direction; and setting a third MVD for the second prediction direction to be equal to the first MVD for the second prediction direction.

Aspect 23B. An apparatus configured to encode video data, the apparatus comprising: a memory; and one or more processors implemented in circuitry and in communication with the memory, the one or more processors configured to: receive a block of video data to be encoded using a 6-parameter affine advanced motion vector predictor (AMVP) mode; determine a first motion vector difference (MVD) for a first control point motion vector (CPMV) for the block; determine a second MVD for a second CPMV for the block; determine a third MVD for a third CPMV for the block; encode the block of video data using the first MVD, the second MVD, and the third MVD; encode a first syntax element indicating the first MVD for the block; and encode a flag that indicates if the second MVD and the third MVD for the block are equal to the first MVD.

Aspect 24B. The apparatus of Aspect 23B, wherein the second MVD and the third MVD are equal to the first MVD, and wherein the one or more processors are further configured to: refrain from encoding a second syntax element indicating the second MVD for the second CPMV of the block; and refrain from encoding a third syntax element indicating the third MVD for the third CPMV of the block.

Aspect 25B. The apparatus of Aspect 23B, wherein the second MVD and the third MVD are not equal to the first MVD, and wherein the one or more processors are further configured to: encode a second syntax element indicating the second MVD for the second CPMV of the block; and encode a third syntax element indicating the third MVD for the third CPMV of the block.

Aspect 26B. The apparatus of any of Aspects 23B-25B, wherein the 6-parameter AMVP mode is a 6-parameter bi-directional AMVP mode, and wherein to encode the flag, the one or more processors are further configured to: encode a single flag that indicates if the second MVD for the second CPMV for the block and the third MVD for a third CPMV for the block are equal to the first MVD, wherein the single flag is applicable to both prediction directions for the 6-parameter bi-directional AMVP mode.

Aspect 27B. The apparatus of any of Aspects 23B-25B, wherein the 6-parameter AMVP mode is a 6-parameter bi-directional AMVP mode, and wherein to encode the flag, the one or more processors are further configured to: encode a first flag for a first prediction direction that indicates if the second MVD for the second CPMV for the block and the third MVD for a third CPMV for the block are equal to the first MVD; and encode a second flag for a second prediction direction that indicates if the second MVD for the second CPMV for the block and the third MVD for a third CPMV for the block are equal to the first MVD.

Aspect 28B. The apparatus of any of Aspects 23B-25B, wherein the 6-parameter AMVP mode is a 6-parameter bi-directional AMVP mode, wherein the second MVD and the third MVD are equal to the first MVD, and wherein the one or more processors are further configured to: refrain from encoding a second syntax element indicating the second MVD for the second CPMV of the block; refrain from encoding a third syntax element indicating the third MVD for the third CPMV of the block; refrain from encoding any syntax elements for MVDs for a second prediction direction; and set all MVDs to zero for the second prediction direction.

Aspect 29B. The apparatus of any of Aspects 23B-25B, wherein the 6-parameter AMVP mode is a 6-parameter bi-directional AMVP mode, wherein the second MVD and the third MVD are equal to the first MVD, and wherein the one or more processors are further configured to: determine the first MVD to be for a first prediction direction; set the second MVD to be equal to the first MVD for the first prediction direction; set the third MVD to be equal to the first MVD for the first prediction direction; derive a first MVD for a second prediction direction from the first MVD for the first prediction direction; set a second MVD for the second prediction direction to be equal to the first MVD for the second prediction direction; and set a third MVD for the second prediction direction to be equal to the first MVD for the second prediction direction.

Aspect 30B. The apparatus of any of Aspects 23B-29B, wherein the apparatus further comprises: a camera configured to capture a picture that includes the block of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving a block of video data to be decoded using a 6-parameter affine advanced motion vector predictor (AMVP) mode;

decoding a first syntax element indicating a first motion vector difference (MVD) for a first control point motion vector (CPMV) for the block;

decoding a flag that indicates whether a second MVD for a second CPMV for the block and a third MVD for a third CPMV for the block are both to be equal to the first MVD;

determining the second MVD and the third MVD based on the flag; and decoding the block of video data using the first MVD, the second MVD, and the third MVD to generate a decoded block.

2. The method of claim 1, wherein the flag indicates the second MVD and the third MVD are both to be equal to the first MVD, and wherein determining the second MVD and the third MVD based on the flag comprises:
    setting the second MVD to be equal to the first MVD; and
    setting the third MVD to be equal to the first MVD.

3. The method of claim 1, wherein the flag indicates the second MVD and the third MVD are not both to be equal to the first MVD, and wherein determining the second MVD and the third MVD based on the flag comprises:
    decoding a second syntax element indicating the second MVD for the second CPMV of the block; and
    decoding a third syntax element indicating the third MVD for the third CPMV of the block.

4. The method of claim 1, wherein the 6-parameter AMVP mode is a 6-parameter bi-directional AMVP mode, and wherein decoding the flag comprises:
    decoding a single flag that indicates if the second MVD for the second CPMV for the block and the third MVD for a third CPMV for the block are both to be equal to the first MVD, wherein the single flag is applicable to both prediction directions for the 6-parameter bi-directional AMVP mode.

5. The method of claim 1, wherein the 6-parameter AMVP mode is a 6-parameter bi-directional AMVP mode, and wherein decoding the flag comprises:
    decoding a first flag for a first prediction direction that indicates whether the second MVD for the second CPMV for the block and the third MVD for a third CPMV for the block are both to be equal to the first MVD; and
    decoding a second flag for a second prediction direction that indicates whether the second MVD for the second CPMV for the block and the third MVD for a third CPMV for the block are both to be equal to the first MVD.

6. The method of claim 1, wherein the 6-parameter AMVP mode is a 6-parameter bi-directional AMVP mode, wherein the flag indicates the second MVD and the third MVD are both to be equal to the first MVD, and wherein the method further comprises:
    determining the first MVD to be for a first prediction direction;
    setting the second MVD to be equal to the first MVD for the first prediction direction;
    setting the third MVD to be equal to the first MVD for the first prediction direction; and
    setting all MVDs to zero for a second prediction direction.

7. The method of claim 1, wherein the 6-parameter AMVP mode is a 6-parameter bi-directional AMVP mode, wherein the flag indicates the second MVD and the third MVD are both to be equal to the first MVD, and wherein the method further comprises:
    determining the first MVD to be for a first prediction direction;

setting the second MVD to be equal to the first MVD for the first prediction direction;

setting the third MVD to be equal to the first MVD for the first prediction direction;

deriving a first MVD for a second prediction direction from the first MVD for the first prediction direction;

setting a second MVD for the second prediction direction to be equal to the first MVD for the second prediction direction; and setting a third MVD for the second prediction direction to be equal to the first MVD for the second prediction direction.

8. An apparatus configured to decode video data, the apparatus comprising:

a memory; and one or more processors implemented in circuitry and in communication with the memory, the one or more processors configured to:

receive a block of video data to be decoded using a 6-parameter affine advanced motion vector predictor (AMVP) mode;

decode a first syntax element indicating a first motion vector difference (MVD) for a first control point motion vector (CPMV) for the block;

decode a flag that indicates whether a second MVD for a second CPMV for the block and a third MVD for a third CPMV for the block are both to be equal to the first MVD;

determine the second MVD and the third MVD based on the flag; and decode the block of video data using the first MVD, the second MVD, and the third MVD to generate a decoded block.

9. The apparatus of claim 8, wherein the flag indicates the second MVD and the third MVD are both to be equal to the first MVD, and wherein to determine the second MVD and the third MVD based on the flag, the one or more processors are further configured to:

set the second MVD to be equal to the first MVD; and set the third MVD to be equal to the first MVD.

10. The apparatus of claim 8, wherein the flag indicates the second MVD and the third MVD are not to be equal to the first MVD, and wherein to determine the second MVD and the third MVD based on the flag, the one or more processors are further configured to:

decode a second syntax element indicating the second MVD for the second CPMV of the block; and decode a third syntax element indicating the third MVD for the third CPMV of the block.

11. The apparatus of claim 8, wherein the 6-parameter AMVP mode is a 6-parameter bi-directional AMVP mode, and wherein to decode the flag, the one or more processors are further configured to:

decode a single flag that indicates if the second MVD for the second CPMV for the block and the third MVD for a third CPMV for the block are both to be equal to the first MVD, wherein the single flag is applicable to both prediction directions for the 6-parameter bi-directional AMVP mode.

12. The apparatus of claim 8, wherein the 6-parameter AMVP mode is a 6-parameter bi-directional AMVP mode, and wherein to decode the flag, the one or more processors are further configured to:

decode a first flag for a first prediction direction that indicates whether the second MVD for the second CPMV for the block and the third MVD for a third CPMV for the block are both to be equal to the first MVD; and decode a second flag for a second prediction direction that indicates whether the second MVD for the second CPMV for the block and the third MVD for a third CPMV for the block are both to be equal to the first MVD.

13. The apparatus of claim 8, wherein the 6-parameter AMVP mode is a 6-parameter bi-directional AMVP mode, wherein the flag indicates the second MVD and the third MVD are both to be equal to the first MVD, and wherein the one or more processors are further configured to:

determine the first MVD to be for a first prediction direction;

set the second MVD to be equal to the first MVD for the first prediction direction;

set the third MVD to be equal to the first MVD for the first prediction direction; and set all MVDs to zero for a second prediction direction.

14. The apparatus of claim 8, wherein the 6-parameter AMVP mode is a 6-parameter bi-directional AMVP mode, wherein the flag indicates the second MVD and the third MVD are both to be equal to the first MVD, and wherein the one or more processors are further configured to:

determine the first MVD to be for a first prediction direction;

set the second MVD to be equal to the first MVD for the first prediction direction;

set the third MVD to be equal to the first MVD for the first prediction direction;

derive a first MVD for a second prediction direction from the first MVD for the first prediction direction;

set a second MVD for the second prediction direction to be equal to the first MVD for the second prediction direction; and set a third MVD for the second prediction direction to be equal to the first MVD for the second prediction direction.

15. The apparatus of claim 8, further comprising:

a display configured to display a picture that includes the decoded block.

16. A method of encoding video data, the method comprising:

receiving a block of video data to be encoded using a 6-parameter affine advanced motion vector predictor (AMVP) mode;

determining a first motion vector difference (MVD) for a first control point motion vector (CPMV) for the block;

determining a second MVD for a second CPMV for the block;

determining a third MVD for a third CPMV for the block;

encoding the block of video data using the first MVD, the second MVD, and the third MVD;

encoding a first syntax element indicating the first MVD for the block; and encoding a flag that indicates whether the second MVD and the third MVD for the block are both equal to the first MVD.

17. The method of claim 16, wherein the second MVD and the third MVD are both equal to the first MVD, and wherein the method further comprises:

refraining from encoding a second syntax element indicating the second MVD for the second CPMV of the block; and refraining from encoding a third syntax element indicating the third MVD for the third CPMV of the block.

18. The method of claim 16, wherein the second MVD and the third MVD are not both equal to the first MVD, and wherein the method further comprises:

encoding a second syntax element indicating the second MVD for the second CPMV of the block; and encoding a third syntax element indicating the third MVD for the third CPMV of the block.

19. The method of claim 16, wherein the 6-parameter AMVP mode is a 6-parameter bi-directional AMVP mode, and wherein encoding the flag comprises:

encoding a single flag that indicates if the second MVD for the second CPMV for the block and the third MVD for a third CPMV for the block are both equal to the first MVD, wherein the single flag is applicable to both prediction directions for the 6-parameter bi-directional AMVP mode.

20. The method of claim 16, wherein the 6-parameter AMVP mode is a 6-parameter bi-directional AMVP mode, and wherein encoding the flag comprises:

encoding a first flag for a first prediction direction that indicates whether the second MVD for the second CPMV for the block and the third MVD for a third CPMV for the block are both equal to the first MVD; and encoding a second flag for a second prediction direction that indicates whether the second MVD for the second CPMV for the block and the third MVD for a third CPMV for the block are both equal to the first MVD.

21. The method of claim 16, wherein the 6-parameter AMVP mode is a 6-parameter bi-directional AMVP mode, wherein the second MVD and the third MVD are both equal to the first MVD, and wherein the method further comprises:

refraining from encoding a second syntax element indicating the second MVD for the second CPMV of the block;

refraining from encoding a third syntax element indicating the third MVD for the third CPMV of the block;

refraining from encoding any syntax elements for MVDs for a second prediction direction; and setting all MVDs to zero for the second prediction direction.

22. The method of claim 16, wherein the 6-parameter AMVP mode is a 6-parameter bi-directional AMVP mode, wherein the second MVD and the third MVD are both equal to the first MVD, and wherein the method further comprises:

determining the first MVD to be for a first prediction direction;

setting the second MVD to be equal to the first MVD for the first prediction direction;

setting the third MVD to be equal to the first MVD for the first prediction direction;

deriving a first MVD for a second prediction direction from the first MVD for the first prediction direction;

setting a second MVD for the second prediction direction to be equal to the first MVD for the second prediction direction; and setting a third MVD for the second prediction direction to be equal to the first MVD for the second prediction direction.

23. An apparatus configured to encode video data, the apparatus comprising:

a memory; and one or more processors implemented in circuitry and in communication with the memory, the one or more processors configured to:

receive a block of video data to be encoded using a 6-parameter affine advanced motion vector predictor (AMVP) mode;

determine a first motion vector difference (MVD) for a first control point motion vector (CPMV) for the block;

determine a second MVD for a second CPMV for the block;

determine a third MVD for a third CPMV for the block;

encode the block of video data using the first MVD, the second MVD, and the third MVD;

encode a first syntax element indicating the first MVD for the block; and encode a flag that indicates whether the second MVD and the third MVD for the block are both equal to the first MVD.

24. The apparatus of claim 23, wherein the second MVD and the third MVD are both equal to the first MVD, and wherein the one or more processors are further configured to:

refrain from encoding a second syntax element indicating the second MVD for the second CPMV of the block; and refrain from encoding a third syntax element indicating the third MVD for the third CPMV of the block.

25. The apparatus of claim 23, wherein the second MVD and the third MVD are not both equal to the first MVD, and wherein the one or more processors are further configured to:

encode a second syntax element indicating the second MVD for the second CPMV of the block; and encode a third syntax element indicating the third MVD for the third CPMV of the block.

26. The apparatus of claim 23, wherein the 6-parameter AMVP mode is a 6-parameter bi-directional AMVP mode, and wherein to encode the flag, the one or more processors are further configured to:

encode a single flag that indicates if the second MVD for the second CPMV for the block and the third MVD for a third CPMV for the block are both equal to the first MVD, wherein the single flag is applicable to both prediction directions for the 6-parameter bi-directional AMVP mode.

27. The apparatus of claim 23, wherein the 6-parameter AMVP mode is a 6-parameter bi-directional AMVP mode, and wherein to encode the flag, the one or more processors are further configured to:

encode a first flag for a first prediction direction that indicates whether the second MVD for the second CPMV for the block and the third MVD for a third CPMV for the block are both equal to the first MVD; and encode a second flag for a second prediction direction that indicates whether the second MVD for the second CPMV for the block and the third MVD for a third CPMV for the block are both equal to the first MVD.

28. The apparatus of claim 23, wherein the 6-parameter AMVP mode is a 6-parameter bi-directional AMVP mode, wherein the second MVD and the third MVD are both equal to the first MVD, and wherein the one or more processors are further configured to:

refrain from encoding a second syntax element indicating the second MVD for the second CPMV of the block;

refrain from encoding a third syntax element indicating the third MVD for the third CPMV of the block;

refrain from encoding any syntax elements for MVDs for a second prediction direction; and set all MVDs to zero for the second prediction direction.

29. The apparatus of claim 23, wherein the 6-parameter AMVP mode is a 6-parameter bi-directional AMVP mode, wherein the second MVD and the third MVD are both equal to the first MVD, and wherein the one or more processors are further configured to:

determine the first MVD to be for a first prediction direction;

set the second MVD to be equal to the first MVD for the first prediction direction;

set the third MVD to be equal to the first MVD for the first prediction direction;

derive a first MVD for a second prediction direction from the first MVD for the first prediction direction;

set a second MVD for the second prediction direction to be equal to the first MVD for the second prediction direction; and set a third MVD for the second prediction direction to be equal to the first MVD for the second prediction direction.

30. The apparatus of claim 23, wherein the apparatus further comprises:

a camera configured to capture a picture that includes the block of video data.

* * * * *